US008952953B2

(12) United States Patent
Ebisuno et al.

(10) Patent No.: US 8,952,953 B2
(45) Date of Patent: *Feb. 10, 2015

(54) DISPLAY DEVICE

(75) Inventors: Kouhei Ebisuno, Kyoto (JP); Toshiyuki Kato, Osaka (JP)

(73) Assignee: Panasonic Corporation, Osaka (JP)

( * ) Notice: Subject to any disclaimer, the term of this patent is extended or adjusted under 35 U.S.C. 154(b) by 41 days.

This patent is subject to a terminal disclaimer.

(21) Appl. No.: 13/495,273

(22) Filed: Jun. 13, 2012

(65) Prior Publication Data

US 2013/0016086 A1 Jan. 17, 2013

Related U.S. Application Data

(63) Continuation of application No. PCT/JP2011/003974, filed on Jul. 11, 2011.

(51) Int. Cl.
*G06F 1/26* (2006.01)
*G09G 3/32* (2006.01)

(52) U.S. Cl.
CPC ........ *G09G 3/3225* (2013.01); *G09G 2320/029* (2013.01); *G09G 3/3233* (2013.01); *G09G 2320/0233* (2013.01); *G09G 2330/02* (2013.01); *G09G 2330/028* (2013.01)
USPC .......................................................... 345/212

(58) Field of Classification Search
USPC ............. 345/76, 77, 100, 204, 207, 209, 211, 345/212, 589; 358/518
See application file for complete search history.

(56) References Cited

U.S. PATENT DOCUMENTS

| | | | | |
|---|---|---|---|---|
| 2004/0257358 | A1* | 12/2004 | Okamoto | 345/211 |
| 2006/0214940 | A1* | 9/2006 | Kinoshita et al. | 345/589 |
| 2008/0266216 | A1* | 10/2008 | Choi | 345/77 |
| 2009/0219263 | A1* | 9/2009 | Shino et al. | 345/204 |
| 2011/0242087 | A1 | 10/2011 | Ebisuno et al. | |

FOREIGN PATENT DOCUMENTS

| | | |
|---|---|---|
| JP | 2006-65148 | 3/2006 |
| JP | 2006-251602 | 9/2006 |
| JP | 2008-268914 | 11/2008 |
| JP | 2009-162980 | 7/2009 |
| WO | 2011/086597 | 7/2011 |

* cited by examiner

*Primary Examiner* — Dwayne Bost
*Assistant Examiner* — Sepehr Azari
(74) *Attorney, Agent, or Firm* — Greenblum & Bernstein P.L.C.

(57) ABSTRACT

A display device includes: a variable-voltage source which supplies at least a potential on a high-potential side or on a low-potential side; an organic EL display unit including a plurality of pixels; a potential difference detecting circuit which detects potentials on pixels; and a signal processing circuit which regulates an output potential from the variable-voltage source such that a potential difference between the potential at the pixel and a reference potential reaches a predetermined potential difference, in which resistance of a power wire at each part between adjacent pixels along a first direction is higher than resistance of a power wire at each part between adjacent pixels along a second direction, and an average distance between adjacent potential detecting points along the first direction is shorter than an average distance between adjacent potential detecting points along the second direction.

7 Claims, 27 Drawing Sheets

| Video data (gradation level) | Required voltage (Red) | Required voltage (Green) | Required voltage (Blue) |
|---|---|---|---|
| 255 | 11.2 | 12.2 | 8.4 |

FIG. 7

| Potential difference value [V] | Voltage drop margin |
|---:|---:|
| 0.0 | 0.0 |
| 0.2 | 0.2 |
| 0.4 | 0.4 |
| 0.6 | 0.6 |
| ⋮ | ⋮ |
| 3.4 | 3.4 |
| 3.6 | 3.6 |
| ⋮ | ⋮ |
| 5.6 | 5.6 |
| 5.8 | 5.8 |
| 6.0 | 6.0 |

FIG. 13

| Video data (gradation level) | Required voltage (Red) | Required voltage (Green) | Required voltage (Blue) |
|---|---|---|---|
| 0 | 4 | 4.2 | 3.5 |
| 1 | 4.1 | 4.3 | 3.5 |
| 2 | 4.1 | 4.4 | 3.6 |
| 3 | 4.2 | 4.5 | 3.6 |
| ⋮ | ⋮ | ⋮ | ⋮ |
| 176 | 8.3 | 9.6 | 6.7 |
| 177 | 8.5 | 9.9 | 6.9 |
| ⋮ | ⋮ | ⋮ | ⋮ |
| 253 | 10.5 | 11.4 | 8.2 |
| 254 | 10.8 | 11.8 | 8.3 |
| 255 | 11.2 | 12.2 | 8.4 |

DISPLAY DEVICE

CROSS REFERENCE TO RELATED APPLICATION

This is a continuation application of PCT Patent Application No. PCT/JP2011/003974 filed on Jul. 11, 2011, designating the United States of America. The entire disclosure of the above-identified application, including the specification, drawings and claims are incorporated herein by reference in its entirety.

TECHNICAL FIELD

The present disclosure relates to active-matrix display devices which use current-driven luminescence elements represented by organic electroluminescence (EL) elements, and more particularly to a display device having excellent power consumption reducing effect.

BACKGROUND ART

In general, the luminance of an organic electroluminescence (EL) element is dependent upon the drive current supplied to the element, and the luminance of the luminescence of the element increases in proportion to the drive current. Therefore, the power consumption of displays made up of organic EL elements is determined by the average of display luminance. Specifically, unlike liquid crystal displays, the power consumption of organic EL displays varies significantly depending on the displayed image.

For example, in an organic EL display, the highest power consumption is required when displaying an all-white image, whereas, in the case of a typical natural image, power consumption which is approximately 20 to 40% that for all-white is considered to be sufficient.

However, because power source circuit design and battery capacity entail designing which assumes the case where the power consumption of a display becomes its highest, it is necessary to consider power consumption that is 3 to 4 times that for the typical natural image, and thus becoming a hindrance to the lowering of power consumption and the miniaturization of devices.

In response there is conventionally proposed a technique which suppresses power consumption with practically no drop in display luminance, by detecting the peak value of video data and adjusting the cathode voltage of the organic EL elements based on such detected data so as to reduce power source voltage (for example, see Patent Reference 1).

CITATION LIST

Patent Literature

[Patent Literature 1] Japanese Unexamined Patent Application Publication No. 2006-065148

SUMMARY OF INVENTION

Technical Problem

Now, since an organic EL element is a current-driven element, current flows through a power source wire and a voltage drop which is proportionate to the wire resistance occurs. As such, the power supply voltage to be supplied to the display is set by adding a margin for a voltage increase compensating for a voltage drop.

In the same manner as the previously described power source circuit design and battery capacity, since the power increase margin is set assuming the case where the power consumption of the display becomes highest, unnecessary power is consumed for typical natural images.

In a small-sized display intended for mobile device use, panel current is small and thus, compared to the voltage to be consumed by pixels, the voltage margin for a voltage increase is negligibly small compared to the voltage consumed in the pixel. However, when current increases with the enlargement of panels, the voltage drop occurring in the power source wire no longer becomes negligible.

However, in the conventional technique in the above-mentioned Patent Reference 1, although power consumption in each of the pixels can be reduced, the power increase margin for a voltage drop cannot be reduced and thus the power consumption reducing effect for household large-sized display devices of 30-inches and above is insufficient.

The present disclosure is conceived in view of the aforementioned problem and is to provide a display device having excellent power consumption reducing effect.

Solution to Problem

In order to achieve the above, the display device according to an aspect of the present disclosure is a display device including: a power supply unit which supplies at least a potential on a high-potential side or on a low-potential side; a display unit including a plurality of pixels arranged in a matrix along a first direction and a second direction that are orthogonal to each other and which receives power supply from the power supply unit; a potential detecting unit which detects at least a potential on one of the high-potential side and the low-potential side at a potential detecting point provided in each of pixels arranged in the display unit; and a voltage regulating unit which regulates at least an output potential on the high-potential side or the low-potential side to be supplied from the power supply unit such that a potential difference between (i) at least one of the potentials on the high-potential side and on the low-potential side and (ii) a reference potential reaches a predetermined potential difference, in which resistance of a power wire at each part between adjacent pixels along the first direction is higher than resistance of a power wire at each part between adjacent pixels along the second direction, and an average distance between adjacent potential detecting points along the first direction is shorter than an average distance between adjacent potential detecting points along the second direction.

Advantageous Effects of Invention

The present disclosure enables the implementation of a display device having excellent power consumption reducing effect and a method for driving the display device.

BRIEF DESCRIPTION OF DRAWINGS

These and other objects, advantages and features of the disclosure will become apparent from the following description thereof taken in conjunction with the accompanying drawings that illustrate a specific embodiment of the present disclosure. In the Drawings:

FIG. 7 is a chart illustrating an example of the voltage margin conversion table referred by the voltage margin setting unit;

FIG. 13 is a chart illustrating an example of the required voltage conversion table included in the signal processing circuit;

DESCRIPTION OF EMBODIMENTS

Figure 1:
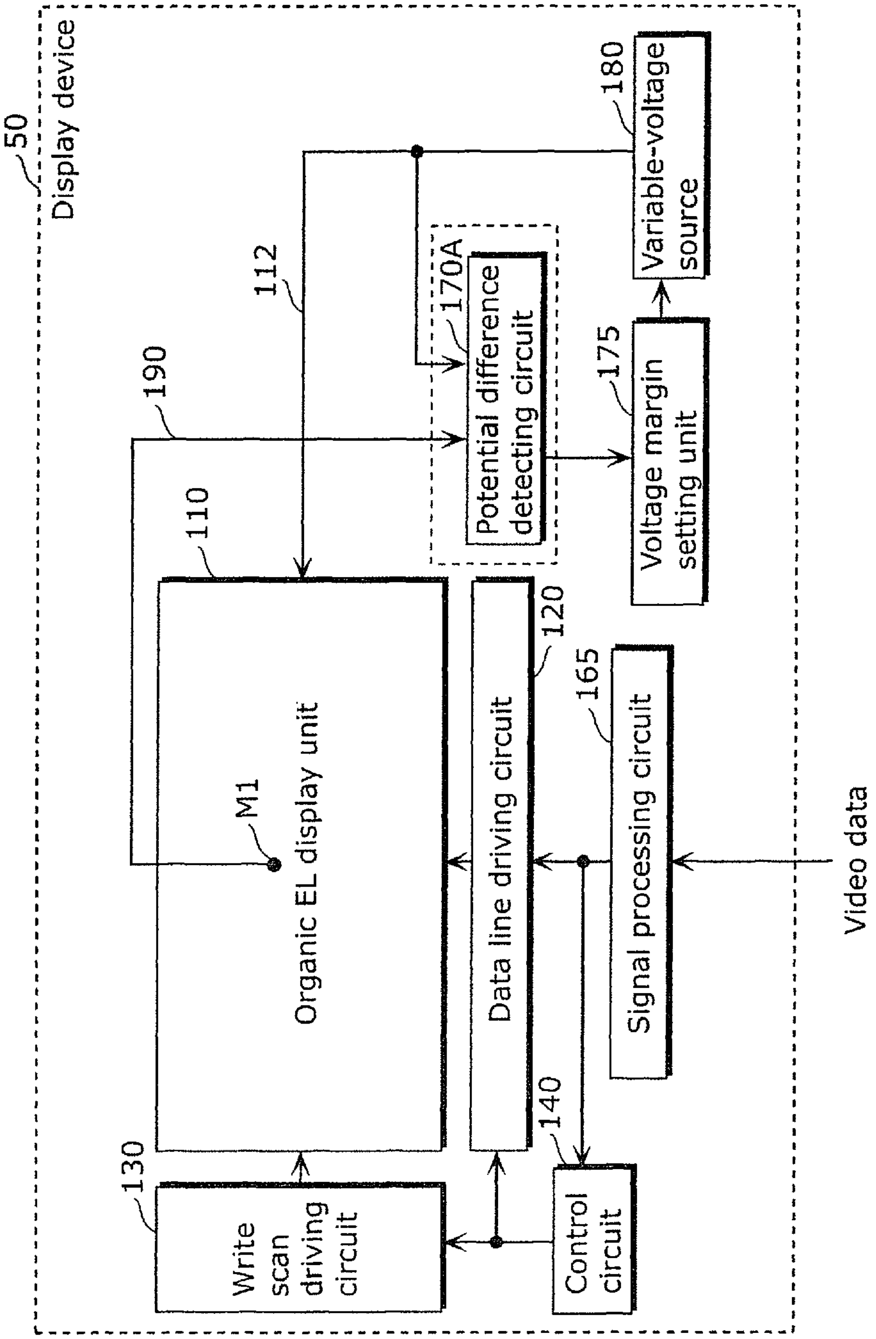
FIG. 1 is a block diagram showing an outline configuration of the display device according to the embodiment 1 of the present disclosure.

The display device according to an aspect of the present disclosure is a display device including: a power supply unit which supplies at least a potential on a high-potential side or on a low-potential side; a display unit including a plurality of pixels arranged in a matrix along a first direction and a second direction that are orthogonal to each other and which receives power supply from the power supply unit; a potential detecting unit which detects at least a potential on one of the high-potential side and the low-potential side at a potential detecting point provided in each of pixels arranged in the display unit; and a voltage regulating unit which regulates at least an output potential on the high-potential side or the low-potential side to be supplied from the power supply unit such that a potential difference between (i) at least one of the potentials on the high-potential side and on the low-potential side and (ii) a reference potential reaches a predetermined potential difference, in which resistance of a power wire at each part between adjacent pixels along the first direction is higher than resistance of a power wire at each part between adjacent pixels along the second direction, and an average distance between adjacent potential detecting points along the first direction is shorter than an average distance between adjacent potential detecting points along the second direction.

The potential detection points arranged appropriately allow effective highly accurate monitoring of the distribution of the amount of voltage drop caused by the power wire resistance network, and achieve maximum power consumption reduction effect while maintaining the quality of the image displayed on the display device. Furthermore, it is possible to suppress the increase in cost by providing the potential detecting line.

The display device according to an aspect of the present disclosure may include: a power supply unit which supplies at least a potential on a high-potential side or on a low-potential side; a display unit including a plurality of pixels arranged in a matrix along a first direction and a second direction that are orthogonal to each other and which receives power supply from the power supply unit; a potential detecting unit which detects at least a potential on one of the high-potential side and the low-potential side at a potential detecting point provided in each of pixels arranged in the display unit; and a voltage regulating unit which regulates at least an output potential on the high-potential side or the low-potential side to be supplied from the power supply unit such that a potential difference between (i) at least one of the potentials on the high-potential side and on the low-potential side and (ii) a reference potential reaches a predetermined potential difference, in which resistance of a power wire at each part between adjacent pixels along the first direction is higher than resistance of a power wire at each part between adjacent pixels along the second direction, and a plurality of first divided regions are set by equally dividing the display unit in the second direction, a plurality of second divided regions are set by equally dividing the display unit in the first direction, and an average distance between adjacent potential detecting points along the first direction in one of the first divided regions including the potential detecting points is shorter than an average distance between the adjacent potential detecting points along the second direction in one of the second divided regions including the potential detecting points.

The display device according to an aspect of the present disclosure may include: a power supply unit which supplies at least a potential on a high-potential side or on a low-potential side; a display unit including a plurality of pixels arranged in a matrix along a first direction and a second direction that are orthogonal to each other and which receives power supply from the power supply unit; a potential detecting unit which detects at least a potential on one of the high-potential side and the low-potential side at a potential detecting point provided in each of pixels arranged in the display unit; and a voltage regulating unit which regulates at least an output potential on the high-potential side or the low-potential side to be supplied from the power supply unit such that a potential difference between (i) at least one of the potentials on the high-potential side and on the low-potential side and (ii) a reference potential reaches a predetermined potential difference, in which resistance of a power wire at each part between adjacent pixels along the first direction is higher than resistance of a power wire at each part between adjacent pixels along the second direction, and a first detection divided region including the potential detecting point is set among a plurality of first divided regions that are set by equally dividing the display unit in the second direction, a second detection divided region including the potential detecting point is set among a plurality of second divided regions that are set by equally dividing the display unit in the first direction, and with respect to an average coordinate in the second direction calculated for one or more of the potential detecting points included in the first detection divided region and an average coordinate in the first direction calculated for one or more of the potential detecting points included in the second detection divided region, a first adjacent distance calculated by averaging differences in the average coordinates in adjacent first detection divided regions for all of the first detection divided regions is longer than a second adjacent distance calculated by averaging differences in the average coordinates between adjacent second detection divided regions for all of the second detection divided regions.

According to the condition for arranging the potential detecting points described above, even if the potential detecting points are not provided in straight line in the first direction and the second direction, it is possible to suppress the increase in cost by providing multiple potential detecting points, and to achieve maximum power consumption reduction effect while maintaining the image quality.

Furthermore, an aspect of the display device according to the present disclosure may include a plurality of detecting lines for transmitting, to the potential detecting unit, potentials on the high-potential side or on the low-potential side, the potentials being detected at a plurality of the potential detecting points, in which the detecting lines include at least one of: three or more high-potential detecting lines for transmitting high-potential side potentials applied to three or more of the pixels, and three or more low-potential detecting lines for transmitting low-potential side potentials applied to three or more of the pixels, and at least one of (i) the high-potential detecting lines and (ii) the low-potential detecting lines are arranged such that an interval between adjacent detecting lines is identical.

With this configuration, it is possible to adjust one of the output potential on the high-potential side from the power supply unit and the output potential on the low-potential side from the power supply unit more appropriately, and can effectively reduce the power consumption even when the size of the display unit is increased. Furthermore, since the detecting lines are provided at an equal interval, the layout of the wires in the display unit can be cyclic, which increases the manufacturing efficiency.

Furthermore, in an aspect of the display device according to the present disclosure, each of the pixels may include: a driver including a source electrode and a drain electrode; and a light-emitting element including a first electrode and a second electrode, the first electrode is connected to one of the source electrode and the drain electrode of the driver, a potential on the high-potential side is applied to one of (i) the other of the source electrode and the drain electrode and (ii) the second electrode, and a potential on the low-potential side is applied to the other of (i) the other of the source electrode and the drain electrode and (ii) the second electrode.

Furthermore, an aspect of the display device according to the present disclosure may include a first power line for electrically connecting the other of the source electrodes and the drain electrodes of the drivers included in pixels adjacent in at least one of the first direction and the second direction; and a second power line for electrically connecting the second electrodes of the light-emitting elements included in pixels adjacent in the first direction and for electrically connecting the second electrodes of the light-emitting elements included in pixels adjacent in the second direction, in which the pixels receive power supply from the power supply unit through the first power line and the second power line.

Furthermore, in an aspect of the display device according to the present disclosure, the light-emitting element may be an organic EL element.

With this, the heat is suppressed along the decrease in the power consumption. Therefore, the degradation in the organic EL element can be suppressed.

The following shall describe the exemplary embodiments of the present disclosure with reference to the drawings. In the embodiments 1 to 5, configurations of the display devices for achieving the power consumption reducing effect shall be described. In the embodiment 6, a configuration of the display unit in the display device for maximizing the power consumption reducing effects shall be described. Note that, in all the figures, the same reference numerals are given to the same or corresponding elements and redundant description thereof shall be omitted.

Embodiment 1

The following shall specifically describe a minimum configuration for the display device to achieve the power consumption reducing effects, in which one detecting point (M1) is included, and is connected to a monitor wire (also referred to as detecting line).

FIG. 1 is a block diagram showing an outline configuration of the display device according to the embodiment 1 of the present disclosure.

A display device 50 shown in the figure includes an organic EL display unit 110, a data line driving circuit 120, a write scan driving circuit 130, a control circuit 140, a signal processing circuit 165, a largest value detecting circuit 170 composed of a potential difference detecting circuit 170A, a variable-voltage source 180, and a monitor wire 190.

Figure 2:
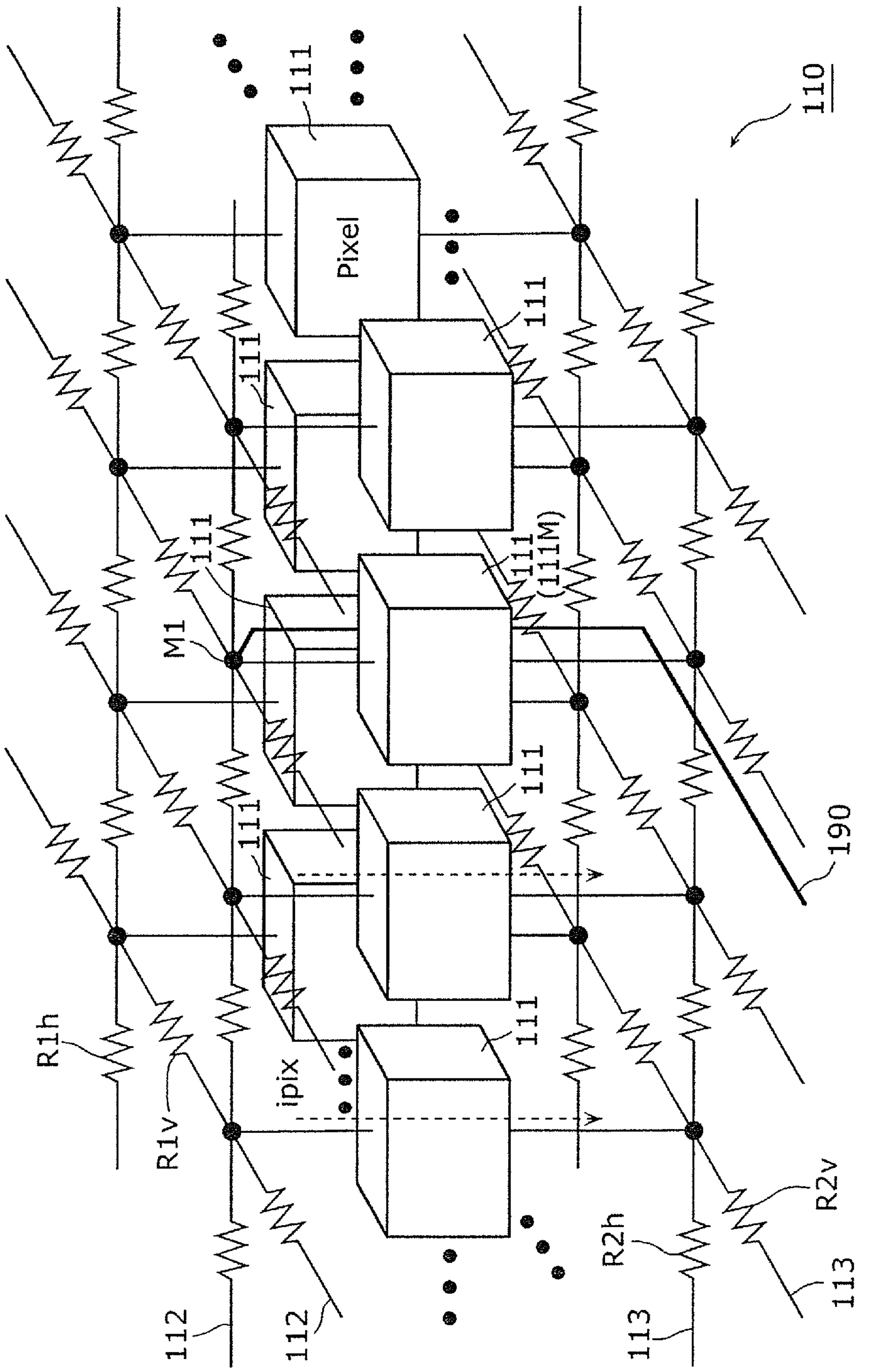
FIG. 2 is a perspective view schematically illustrating the configuration of the organic EL display unit.

FIG. 2 is a perspective view schematically illustrating the configuration of the organic EL display unit 110. Note that the lower portion of the figure is the display screen side.

As shown in the figure, the organic EL display unit 110 includes pixels 111, a first power source wire 112, and a second power source wire 113.

Each pixel 111 is connected to the first power source wire 112 and the second power source wire 113, and emits light at a luminance that is in accordance with a pixel current ipix that flows to the pixel 111. At least one predetermined pixel out of the pixels 111 is connected to the monitor wire 190 at a detecting point M1. In the following description, a pixel directly connected to monitor wire 190 is referred to as a monitor pixel 111M. The monitor pixel 111M is provided, for example, near the center of the organic EL display unit 110. Note that, an area near the center includes the center and a peripheral part around the center.

The first power source wire 112 is arranged in a net-like manner, a potential corresponding to a high-potential side potential output from the variable-voltage source 180 is applied. The second power source wire 113 is formed in the form of a continuous film on the organic EL display unit 110, and a potential corresponding to a low-potential side potential output from the variable-voltage source 180 is applied from the peripheral part of the organic EL display unit 110. In FIG. 2, the first power source wire 112 and the second power source wire 113 are schematically illustrated in mesh-form in order to show the resistance components of the first power source wire 112 and the second power source wire 113. Note that, the second power supply wire 113 may be a ground line, for example, and may be grounded to a common ground potential of the display device 50 at the peripheral part of the organic EL display unit 110.

In the first power source wire 112, horizontal power source wire resistance R1*h* and vertical power source wire resistance R1*v* exist. In the second power source wire 113, horizontal power source wire resistance R2*h* and vertical power source wire resistance R2*v* exist. Noted that, although not illustrated, each of the pixels 111 is connected to the write scan driving circuit 130 and the data line driving circuit 120, and is also connected to a scanning line for controlling the timing at which the pixel emits light and stops producing luminescence, and to a data line for supplying signal voltage corresponding to the luminance of light emitted from the pixel 111.

Figure 3:
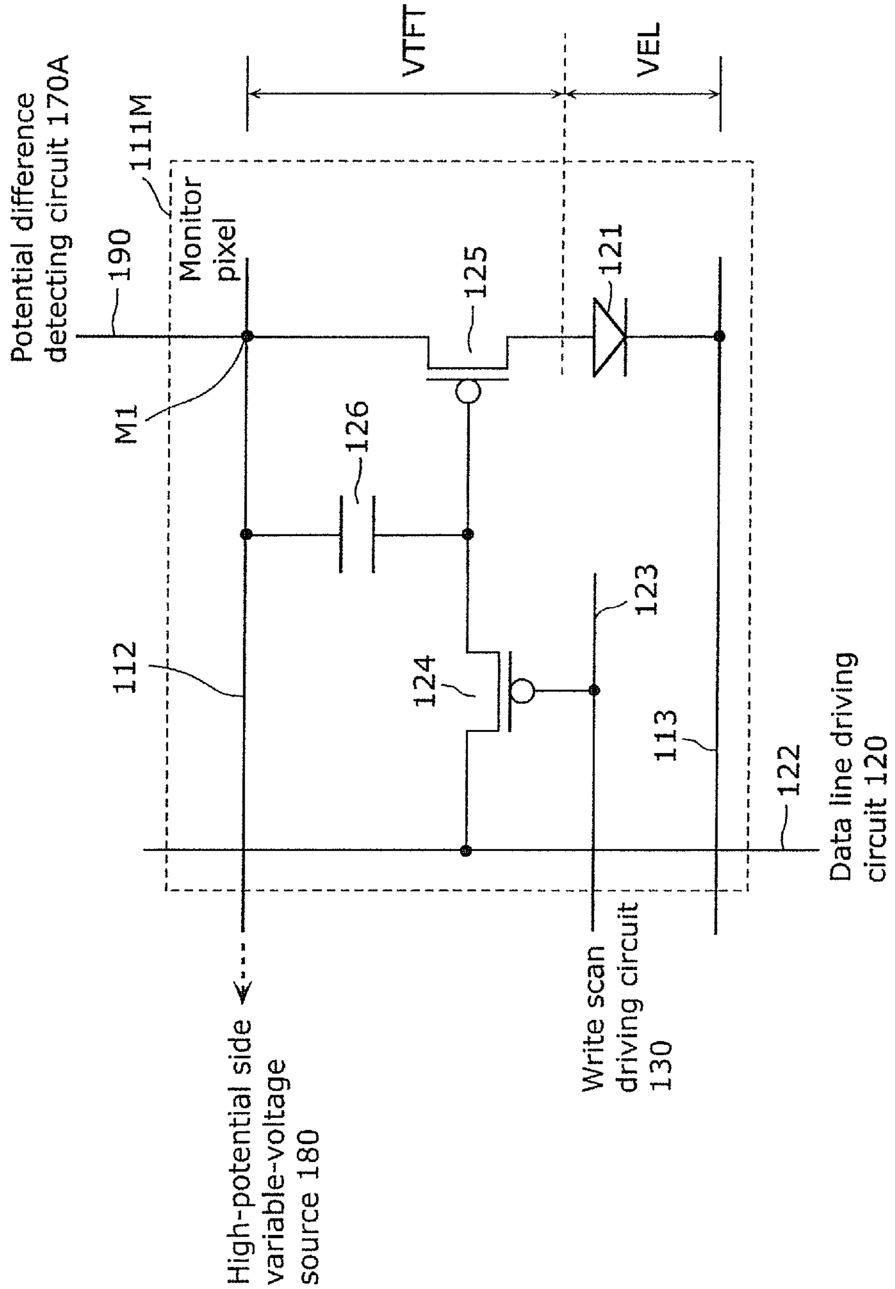
FIG. 3 is a circuit diagram illustrating an example of a specific configuration of the pixel.

FIG. 3 is a circuit diagram illustrating an example of a specific configuration of the pixel 111.

The pixel 111 includes a driver and a luminescence element. The driver includes a source electrode and a drain electrode. The luminescence element includes a first electrode and a second electrode, and the first electrode is connected to one of the source electrode and the drain electrode of the driver. The high-side potential is applied to one of (i) the other of the source electrode and the drain electrode and (ii) the second electrode, and the low-side potential is applied to the other of (i) the other of the source electrode and the drain electrode and (ii) the second electrode. Specifically, each of the pixels 111 includes an organic EL element 121, a data line 122, a scanning line 123, a switch transistor 124, a driving transistor 125, and a capacitor 126. The monitor pixels 111 are, for example, arranged in a matrix in the organic EL display unit 110.

The organic EL element 121 is an example of a light-emitting element having an anode electrode connected to the drain electrode of the driving transistor 125 and a cathode electrode connected to the second power source wire 113, and emits light with a luminance that is in accordance with the current value flowing between the anode and the cathode. The cathode-side electrode of the organic EL element 121 forms part of a common electrode provided in common to the pixels 111. The common electrode is electrically connected to the variable-voltage source 180 so that potential is applied to the common electrode from the peripheral part thereof. Specifically, the common electrode functions as the second power source wire 113 in the organic EL display unit 110. Furthermore, the cathode-side electrode is formed of a transparent conductive material made of a metallic oxide. Note that, the electrode on the anode side of the organic EL element 121 is an example of the first electrode of the present disclosure, and the electrode on the cathode side of the organic EL element 121 is an example of the second electrode of the present disclosure.

The data line 122 is connected to the data line driving circuit 120 and one of the source electrode and the drain electrode of the switch transistor 124, and signal voltage corresponding to video data is applied to the data line 122 by the data line driving circuit 120.

The scanning line 123 is connected to the write scan driving circuit 130 and the gate electrode of the switch transistor 124, and turns the switching transistor 124 on and off according to the voltage applied by the write scan driving circuit 130.

The switching transistor 124 has one of a source electrode and a drain electrode connected to the data line 122, the other of the source electrode and the drain electrode connected to the gate electrode of the driving transistor 125 and one end of the capacitor 126, and is, for example, a p-type thin-film transistor (TFT).

The driving transistor 125 is a driver according the present disclosure, and having a source electrode connected to first power source wire 112, a drain electrode connected to the anode electrode of the organic EL element 121, and a gate electrode connected to the one end of the capacitor 126 and the other of the source electrode and the drain electrode of the switching transistor 124, and is, for example, a p-type TFT. With this, the driving transistor 125 supplies the organic EL element 121 with current that is in accordance with the voltage held in the capacitor 126. In the monitor pixel 111M, the source electrode of the driving transistor 125 is connected to the monitor wire 190.

The capacitor 126 has one end connected to the other of the source electrode and the drain electrode of the switch transistor 124, and the other end connected to the first power source wire 112, and holds the potential difference between the potential of the first power source wire 112 and the potential of the gate electrode of the driving transistor 125 when the switch transistor 124 becomes non-conductive. Specifically, the capacitor 126 holds a voltage corresponding to the signal voltage.

The data line driving circuit 120 outputs signal voltage corresponding to video data, to the pixels 111 via the data lines 122.

The write scan driving circuit 130 sequentially scans the pixels 111 by outputting a scanning signal to scanning lines 123. Specifically, the switch transistors 124 are switched on and off per row. With this, the signal voltages outputted to the data lines 122 are applied to the pixels 111 in the row selected by the write scan driving circuit 130. Therefore, the pixels 111 emit light with a luminance that is in accordance with the video data.

The control circuit 140 instructs the drive timing to each of the data line driving circuit 120 and the write scan driving circuit 130.

The signal processing circuit 165 outputs the signal voltage corresponding to the input video data to the data line driving circuit 120.

The potential difference detecting circuit 170A detects, with regard to the monitor pixel 111M, the potential on the high-potential side applied to the monitor pixel 111M. Specifically, the potential difference detecting circuit 170A measures, via the monitor wire 190, a potential on the high-potential side applied to the monitor pixel 111M. Stated differently, the potential at the detecting point M1 is measured. Subsequently, the potential difference detecting circuit 170A measures the output potential on the high-potential side from the variable-voltage source 180, and calculates the potential difference ΔV between the measured high-potential side potential applied to the monitor pixel 111 and the output potential on the high-potential side from the variable-voltage source 180. The potential difference detecting circuit 170A outputs the measured potential difference ΔV to the voltage margin setting unit 175.

The voltage margin setting unit 175 is a voltage regulating unit according to the embodiment 1, and regulates the variable-voltage source 180 such that the potential the potential on the monitor pixel 111M is a predetermined potential, using the (VEL+VTFT) voltage at the peak gradation level and the potential difference ΔV detected by the potential different detecting circuit 170A. More specifically, the signal processing circuit 165 calculates the voltage margin Vdrop based on the potential difference detected by the potential difference detecting circuit 170A. Subsequently, a sum of the (VEL+VTFT) voltage at the peak gradation level and the voltage margin Vdrop are calculated, and the result VEL+VTFT+Vdrop is output to the variable-voltage source 180 as the voltage of the first reference voltage Vref1A.

The variable-voltage source 180 is a power supply unit in the present disclosure, and outputs the potential on the high potential side and the potential on the low potential side to the organic EL display unit 110. The variable-voltage source 180 outputs an output voltage Vout setting the potential on the high-potential side of the monitor pixel 111M to a predetermined potential difference (VEL+VTFT), using the first reference voltage Vref1 output by the voltage margin setting unit 175.

The monitor wire 190 has one end connected to the monitor pixel 111M and the other end connected to the potential difference detecting circuit 170, and transmits the high-side potential applied to the monitor pixel 111M.

Next, a detailed configuration of the variable-voltage source 180 shall be briefly described.

Figure 4:
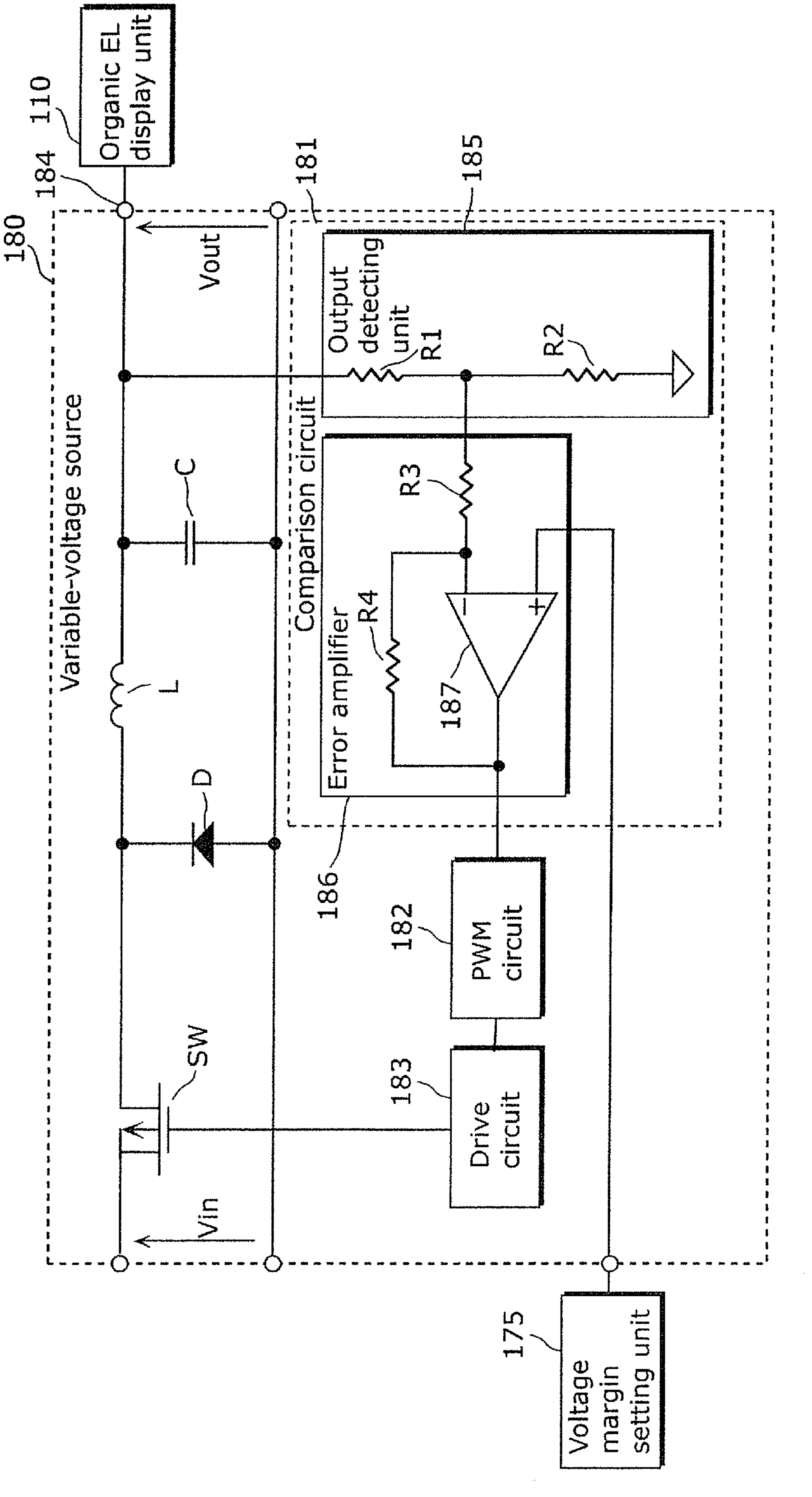
FIG. 4 is a block diagram showing an example of a specific configuration of a variable-voltage source according to the embodiment 1.

FIG. 4 is a block diagram showing an example of a specific configuration of a variable-voltage source according to the embodiment 1. Note that the organic EL display unit 110 and the voltage margin setting unit 175 which are connected to the variable-voltage source are also shown in the figure.

The variable-voltage source 180 shown in the figure includes a comparison circuit 181, a pulse width modulation (PWM) circuit 182, a drive circuit 183, a switch SW, a diode D, an inductor L, a capacitor C, and an output terminal 184, and converts an input voltage Vin into an output voltage Vout which is in accordance with the first reference voltage Vref1, and outputs the output voltage Vout from the output terminal 184. It is to be noted that, although not illustrated, an AC-DC converter is provided in a stage ahead of an input terminal to which the input voltage Vin is inputted, and it is assumed that conversion, for example, from 100 V AC to 20 V DC has already been carried out.

The comparison circuit 181 includes an output detecting unit 185 and an error amplifier 186, and outputs a voltage that is in accordance with the difference between the output voltage Vout and the first reference voltage Vref1, to the PWM circuit 182.

The output detecting unit 185, which includes two resistors R1 and R2 provided between the output terminal 184 and a grounding potential, divides the output voltage Vout in accordance with the resistance ratio between the resistors R1 and R2, and outputs the voltage-divided output voltage Vout to the error amplifier 186.

The error amplifier 186 compares the Vout that has been divided by the output detection unit 185 and the first reference voltage Vref1A outputted by the voltage margin setting unit 175, and outputs, to the PWM circuit 182, a voltage that is in accordance with the comparison result. Specifically, the error amplifier 186 includes an operational amplifier 187 and resistors R3 and R4. The operational amplifier 187 has an inverting input terminal connected to the output detecting unit 185 via the resistor R3, a non-inverting input terminal connected to the voltage margin setting unit 175, and an output terminal connected to the PWM circuit 182. Furthermore, the output terminal of the operational amplifier 187 is connected to the inverting input terminal via the resistor R4. With this, the error amplifier 186 outputs, to the PWM circuit 182, a voltage that is in accordance with the potential difference between the voltage inputted from the output detecting unit 185 and the first reference voltage Vref1A inputted from the signal processing circuit 165. Stated differently, the error amplifier 186 outputs, to the PWM circuit 182, a voltage that is in accordance with the potential difference between the output voltage Vout and the first reference voltage Vref1A.

The PWM circuit 182 outputs, to the drive circuit 183, pulse waveforms having different duties depending on the voltage outputted by the comparison circuit 181. Specifically, the PWM circuit 182 outputs a pulse waveform having a long ON duty when the voltage outputted by the comparison circuit 181 is large, and outputs a pulse waveform having a short ON duty when the outputted voltage is small. Specifically, the PWM circuit 182 outputs a pulse waveform having a long ON duty when the potential difference between the output voltage Vout and the first reference voltage Vref1A is large, and outputs a pulse waveform having a short ON duty when the potential difference between the output voltage Vout and the first reference voltage Vref1A is small. It is to be noted that the ON period of a pulse waveform is a period in which the pulse waveform is active.

The drive circuit 183 turns on the switch SW during the period in which the pulse waveform outputted by the PWM circuit 182 is active, and turns off the switch SW during the period in which the pulse waveform outputted by the PWM circuit 182 is inactive.

The switch SW is switched on and off by the drive circuit 183. The input voltage Vin is outputted, as the output voltage Vout, to the output terminal 184 via the inductor L and the capacitor C only while the switch is on. Accordingly, from 0V, the output voltage Vout gradually approaches 20 V (Vin). At this time the inductor L and the capacitor C are charged. Since voltage is applied (charged) to both ends of the inductor L, the output voltage Vout becomes a potential which is lower than the input voltage Vin by such voltage.

As the output voltage Vout approaches the first reference voltage Vref1A, the voltage inputted to the PWM circuit 182 becomes smaller, and the on-duty of the pulse signal outputted by the PWM circuit 182 becomes shorter.

Then, the time in which the switch SW is turned on also becomes shorter, and the output voltage Vout gradually converges with the first reference voltage Vref1A.

The potential of the output voltage Vout, while having slight voltage fluctuations, eventually settles to a potential in the vicinity of Vout=Vref1A.

In this manner, the variable-voltage source 180 generates the output voltage Vout which becomes the first reference voltage Vref1A outputted by the signal processing circuit 160, and supplies the output voltage Vout to the organic EL display unit 110.

Figures 5, 6:
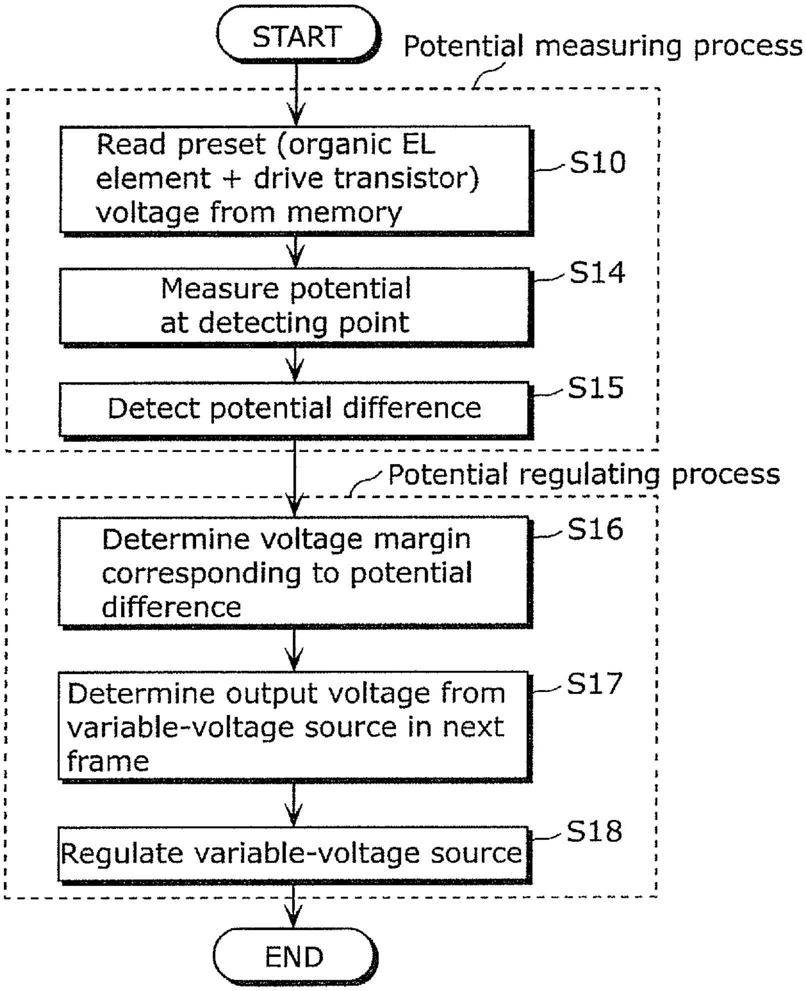
FIG. 5 is a flowchart illustrating an operation of the display device according to the embodiment 1 of the present disclosure.
FIG. 6 is a chart illustrating an example of the required voltage conversion table referred by the voltage margin setting unit.

Next, the operation of the aforementioned display device 50 shall be described using FIGS. 5 to 7.

FIG. 5 is a flowchart illustrating an operation of the display device 50 according to the embodiment 1.

First, the voltage margin setting unit 175 reads the voltage (VEL+VTFT) corresponding to the peak gradation level from the memory (step S10). Specifically, the voltage margin setting unit 175 determines the VTFT+VEL corresponding to the gradation levels for each color, using a required voltage conversion table indicating the required voltage VTFT+VEL corresponding to the gradation levels for each color.

FIG. 6 is a chart illustrating an example of the required voltage conversion table referred by the signal processing circuit 175.

As illustrated in FIG. 6, the required voltage VTFT+VEL corresponding to the peak gradation level (level 255) are stored in the required voltage conversion table. For example, the required voltage for the peak gradation level of R is 11.2 V, the required voltage for the peak gradation level of G is 12.2 V, and the required voltage for the peak gradation level of B is 8.4 V. Among the required voltages corresponding to the peak gradation levels of the respective colors, the largest voltage is 12.2 V for G. Therefore, the voltage margin setting unit 175 determines VTFT+VEL to be 12.2 V.

The potential difference detecting circuit 170A detects the potential at the detecting point M1 via the monitor wire 190 (step S14).

Next, the potential difference detecting circuit 170A detects the potential difference ΔV which is the difference between the potential at the output terminal 184 of the variable-voltage source 180 and the potential at the detecting point M1 (step S15). The potential difference detecting circuit 170A outputs the measured potential difference ΔV to the voltage margin setting unit 175.

Next, the voltage margin setting unit 175 determines the voltage margin Vdrop corresponding to the potential difference ΔV detected by the potential difference detecting circuit 170A from the potential difference signal output from the potential difference detecting circuit 170A. More specifically, the voltage margin setting unit 175 includes a voltage margin conversion table corresponding to the potential difference ΔV.

FIG. 7 is a chart illustrating an example of the voltage margin conversion table referred by the voltage margin setting unit 175.

Figure 11:
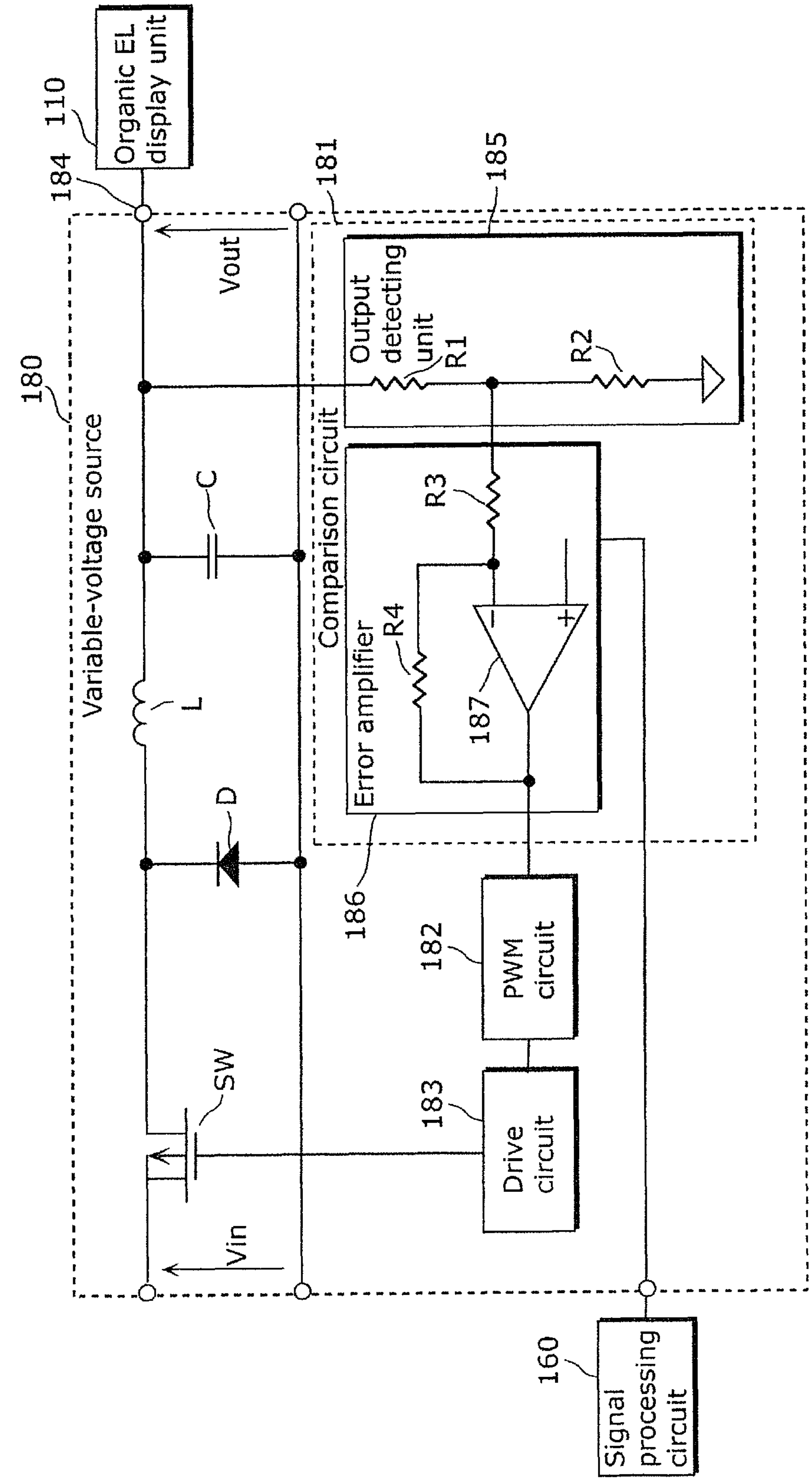
FIG. 11 is a block diagram showing an example of a specific configuration of a variable-voltage source according to the embodiment 2.

As illustrated in FIG. 11, in the voltage margin conversion table, the voltage margins Vdrop corresponding to the potential differences ΔV are stored. For example, when the potential difference ΔV is 3.4 V, the voltage margin Vdrop is 3.4 V. Therefore, the voltage margin setting unit 175 determines the voltage drop margin Vdrop to be 3.4 V.

As shown in the voltage margin conversion table, the relationship between the potential difference ΔV and the voltage margin Vdrop is an increasing function. Furthermore, the output voltage Vout of the variable-voltage source 180 rises with a bigger voltage drop margin Vdrop. In other words, the relationship between the potential difference ΔV and the output voltage Vout is an increasing function.

Next, the voltage margin setting unit 175 determines the output voltage Vout to be output by the variable-voltage source 180 in the next frame period (step S17). More specifically, the output voltage Vout to be output by the variable-voltage source 180 in the next frame period is set to be VTFT+VEL+Vdrop which is a sum of VTFT+VEL which is the voltage required for the organic EL element 121 and the drive transistor 125 determined in step S13 and the voltage margin Vdrop corresponding to VTFT+VEL and the potential difference ΔV determined in step S15.

Finally, the voltage margin setting unit 175 regulates the variable-voltage source 180 by setting the first reference voltage Vref1A as VTFT+VEL+Vdrop at the beginning of the next frame period (step S18). With this, in the next frame period, the variable-voltage source 180 supplies Vout=VTFT+VEL+Vdrop to the organic EL display unit 110.

As described above, the display device 50 according to the embodiment is configured as a minimum configuration for achieving the power consumption reducing effect. More specifically, the display device 100 according to the embodiment 1 includes the variable-voltage source 180, the potential difference detecting circuit 170A, and the voltage margin setting unit 175. The variable-voltage source 180 outputs the potential difference between the potential on the positive electrode side and the potential on the negative electrode side as the power source voltage. The potential difference detecting circuit 170A detects the potential on the high-potential side applied to the monitor pixel 111M and high-potential side output voltage Vout from the variable voltage source 180 for the monitor pixel 111M. The voltage margin setting unit 175 regulates the variable-voltage source 180 such that the high-potential side potential to be applied to the monitor pixel 111M measured by the potential difference detecting circuit 170 to the predetermined potential (VTFT+VEL). Furthermore, the potential difference detecting circuit 170A measures the output voltage Vout on the high-potential side of the variable-voltage source 180, detects the potential difference between the measured output voltage Vout on the high-potential side and the potential on the high-potential side applied to the monitor pixel 111M, and regulates the variable-voltage source depending on the potential difference detected by the potential difference detecting circuit 170A.

With this, the display device 50 detects the voltage drop by the horizontal power source wire resistance R1*h* and the vertical power source wire resistance R1*v*, and feeds the degree of voltage drop back to the variable-voltage source 180. With this, excess in the supply voltage can be reduced, reducing the power consumption.

In the display device 50, the monitor pixel 111M is provided near the center of the organic EL display unit 110. Accordingly, even if the size of the organic EL display unit 110 is increased, the output voltage Vout from the variable-voltage source 180 can be easily regulated.

Furthermore, by reducing the power consumption, the heat generated by the organic EL device 121 is suppressed, thereby preventing the degradation of the organic EL element 121.

Next, in the display device 50 described above, the transition of the display pattern when the input video data changes at or before the Nth frame and at or after the n+1th frame shall be described with reference to FIGS. 8 and 9.

First, the video data that is assumed to have been inputted in the Nth frame and the N+1th frame shall be described.

First, it is assumed that, up to the Nth frame, the video data corresponding to the central part of the organic EL display unit 110 is a peak gradation level (R:G:B=255:255:255) in which the central part of the organic EL display unit 110 is seen as being white. On the other hand, it is assumed that the video data corresponding to a part of the organic EL display unit 110 other than the central part is a gray gradation level (R:G:B=50:50:50) in which the part of the organic EL display unit 110 other than the central part is seen as being gray.

Furthermore, from the N+1th frame onward, it is assumed that the video data corresponding to the central part of the organic EL display unit 110 is the peak gradation level (R:G:B=255:255:255) as in the Nth frame. On the other hand, it is assumed that the video data corresponding to the part of the organic EL display unit 110 other than the central part is a gray gradation level (R:G:B=150:150:150) that can be seen as a brighter gray than in the Nth frame.

Next, the operation of the display device 50 in the case where video data as described above is inputted in the Nth frame and the N+1th frame shall be described.

Figure 8:
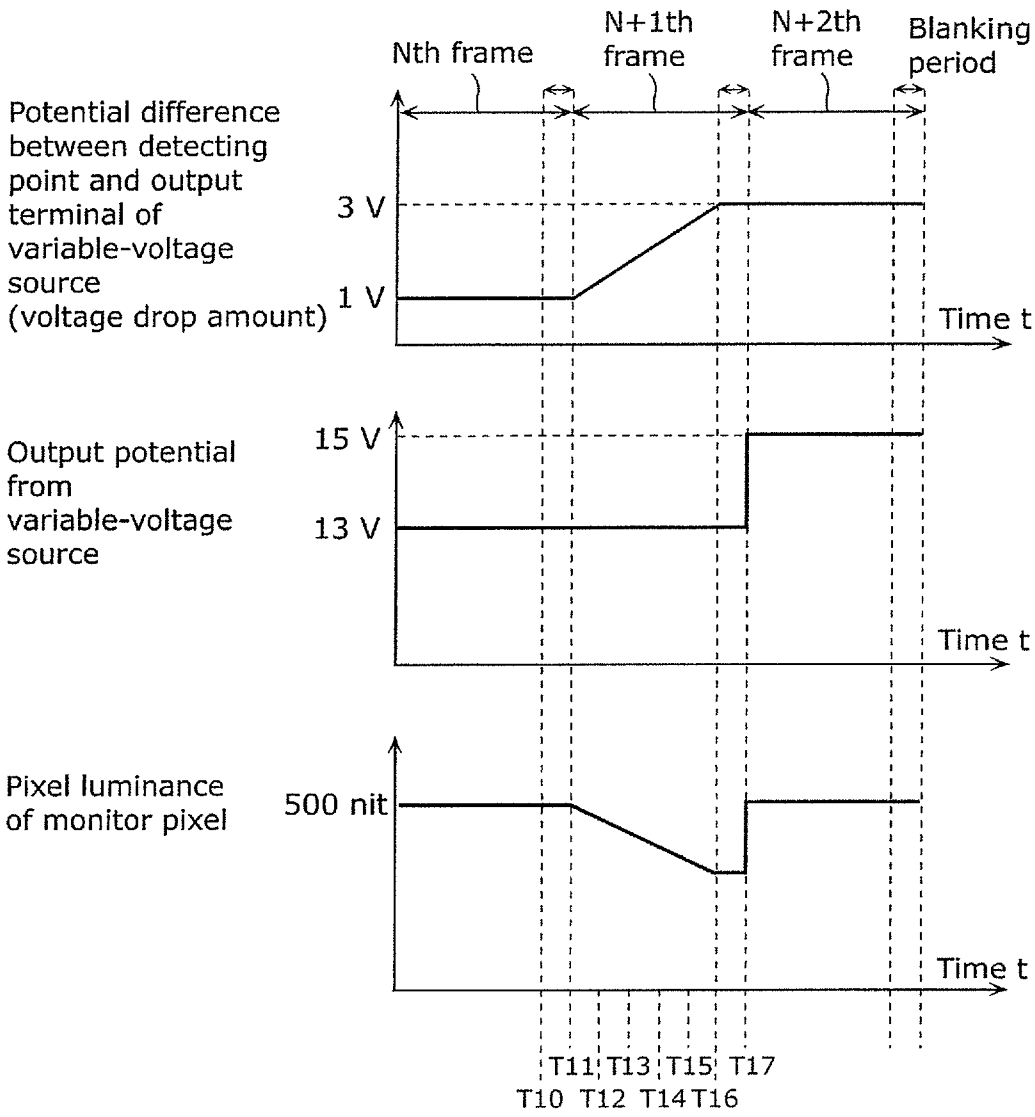
FIG. 8 is a timing chart illustrating the operation of the display device from the Nth frame to N+2th frame.

FIG. 8 is a timing chart showing the operation of the display device 50 from the Nth frame to the N+2th frame.

FIG. 8 illustrates the potential difference ΔV detected by the potential difference detecting circuit 170A, an output voltage Vout from the variable-voltage source 180, and the luminance of the monitor pixel 111M. Furthermore, a blanking period is provided at the end of each frame period.

Figure 9:
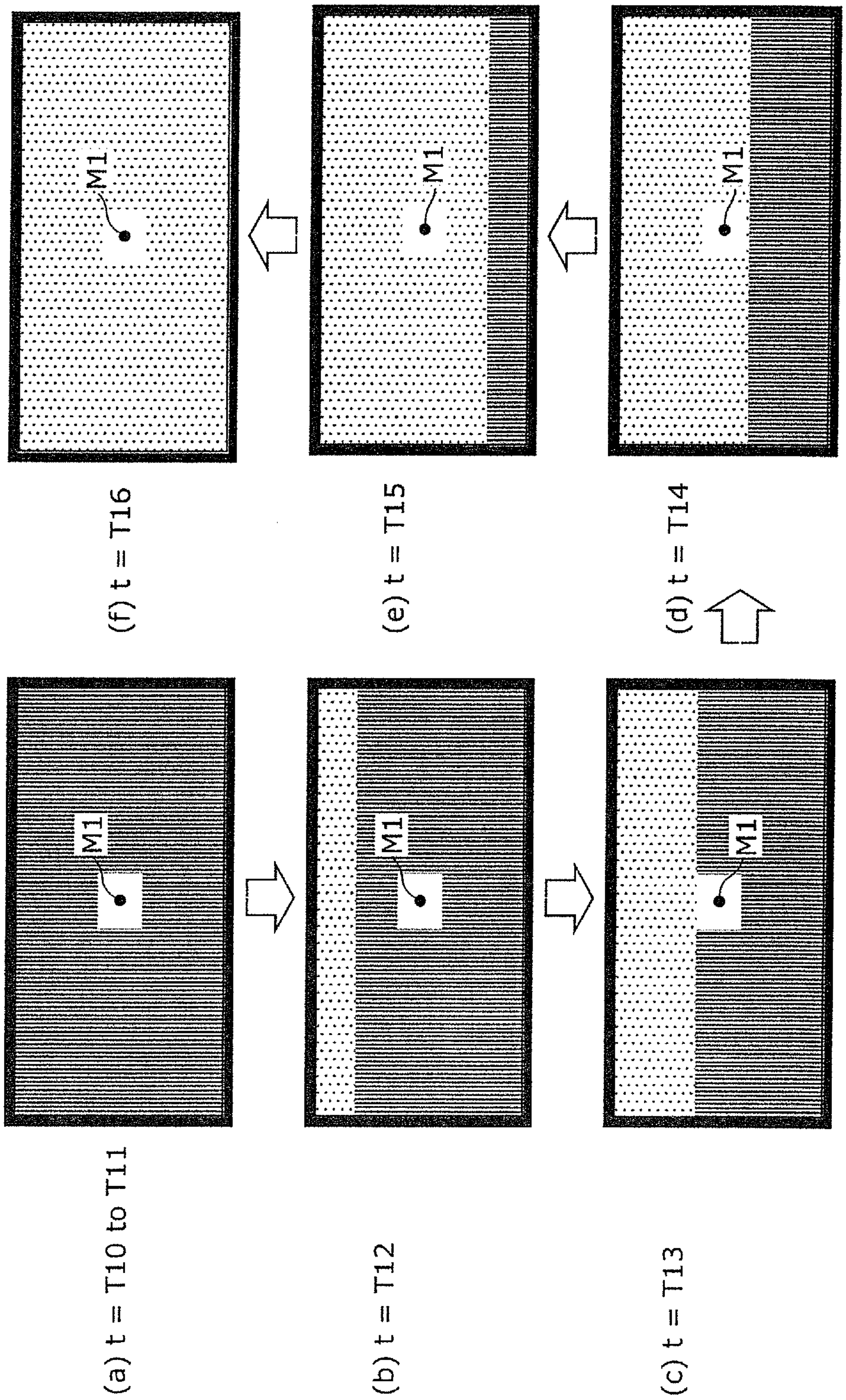
FIG. 9 is a perspective view schematically illustrating the image displayed on the organic EL display unit.

FIG. 9 is diagram schematically showing images displayed on the organic EL display unit.

In time t=T10, the signal processing circuit 165 inputs the video data for the N frame. The voltage margin setting unit 175 sets the required voltage 12.2 V for the peak gradation level of G, using the required voltage conversion table.

Meanwhile, the potential difference detecting circuit 170A detects the potential at the detecting point M1 via the monitor wire 190, and detects the potential difference ΔV which is the difference between the aforementioned potential and the output voltage Vout outputted from the variable-voltage source 180. For example, ΔV=1 V is detected in time t=T10. Subsequently, the voltage margin Vdrop in the N+1th frame is determined as 1 V, using the voltage margin conversion table.

A time t=T10 to T11 is the blanking period of the Nth frame. In this period, an image which is the same as that in the time t=T10 is displayed in the organic EL display unit 110.

(a) in FIG. 9 schematically shows an image displayed on the organic EL display unit 110 in time t=T10 to T11. In this period, the image displayed on the organic EL display unit 110 corresponds to the image data of the Nth frame, and thus the central part is white and the part other than the central part is gray.

In time t=T11, the voltage margin setting unit 175 sets the voltage of the first reference voltage Vref1A as the sum of VTFT+VEL+Vdrop (for example, 13.2 V) of the voltage (VTFT+VEL) and the voltage drop margin Vdrop.

Over a time t=T11 to T16, the image corresponding to the video data of the N+1th frame is sequentially displayed on the organic EL display unit 110 ((b) to (f) in FIG. 9). At this time, the output voltage Vout from the variable-voltage source 180 is, at all times, the VTFT+VEL+Vdrop set to the voltage of the first reference voltage Vref1A in time t=T11. However, the video data corresponding to the part of the organic EL display unit 110 other than the central part is a gray gradation level that can be seen as a gray that is brighter than that in the Nth frame. Therefore, the amount of current supplied by the variable-voltage source 180 to the organic EL display unit 110 gradually increases over a time t=T11 to T16, and the voltage drop in the first power source wire 112 gradually increase following this increase in the amount of current. With this, there is a shortage of power source voltage for the pixels 111 in the central part of the organic EL display unit 110, which are the pixels 111 in a brightly displayed region. Stated differently, luminance drops below the image corresponding to the video data R:G:B=255:255:255 of the N+1th frame. Specifically, over the time t=T11 to T16, the luminance of light emitted from the pixels 111 at the central part of the organic EL display unit 110 gradually drops.

Next, in time t=T16, the signal processing circuit 165 inputs the video data for the N+1th frame. The voltage margin setting unit 175 continuously sets the required voltage 12.2 V for the peak gradation level of G as the voltage (VTFT+VEL), using the required voltage conversion table.

Meanwhile, the potential difference detecting circuit 170A detects the potential at the detecting point M1 via the monitor wire 190, and detects the potential difference ΔV which is the difference between the aforementioned potential and the output voltage Vout outputted from the variable-voltage source 180. For example, ΔV=3 V is detected in time t=T16. Subsequently, the voltage margin Vdrop in the N+1th frame is determined as 3 V, using the voltage margin conversion table.

In time t=T17, the voltage margin setting unit 175 sets the voltage of the first reference voltage Vref1A as the sum of VTFT+VEL+Vdrop (for example, 15.2 V) of the voltage (VTFT+VEL) and the voltage drop margin Vdrop. Therefore, from the time t=17 onward, the potential difference between the anode side and the cathode side of the monitor pixel 111M is VTFT+VEL which is the predetermined potential.

In this manner, in the display device 50, although luminance temporarily drops in the N+1th frame, this is a very short period and thus has practically no impact on the user.

Embodiment 2

A display device according to the embodiment 2 differs from the display device according to the embodiment 1 in that, not only the reference voltage input to the variable voltage source changes depending on the change in the potential difference ΔV detected by the potential difference detecting circuit, but also changes depending on peak signals each detected for a frame of the input video data. Note that, in the following description, description for the components identical to the embodiment 1 shall be omitted, and the description shall be made focusing on the difference from the embodiment 1. Furthermore, with regard to the drawing overlapping the drawing in the embodiment 1, the drawing applied to the embodiment 1 shall be used.

The following shall specifically describe a minimum configuration for the display device to achieve the power consumption reducing effects, in which one detecting point (M1) is included, and is connected to a monitor wire (also referred to as detecting line).

Figure 10:
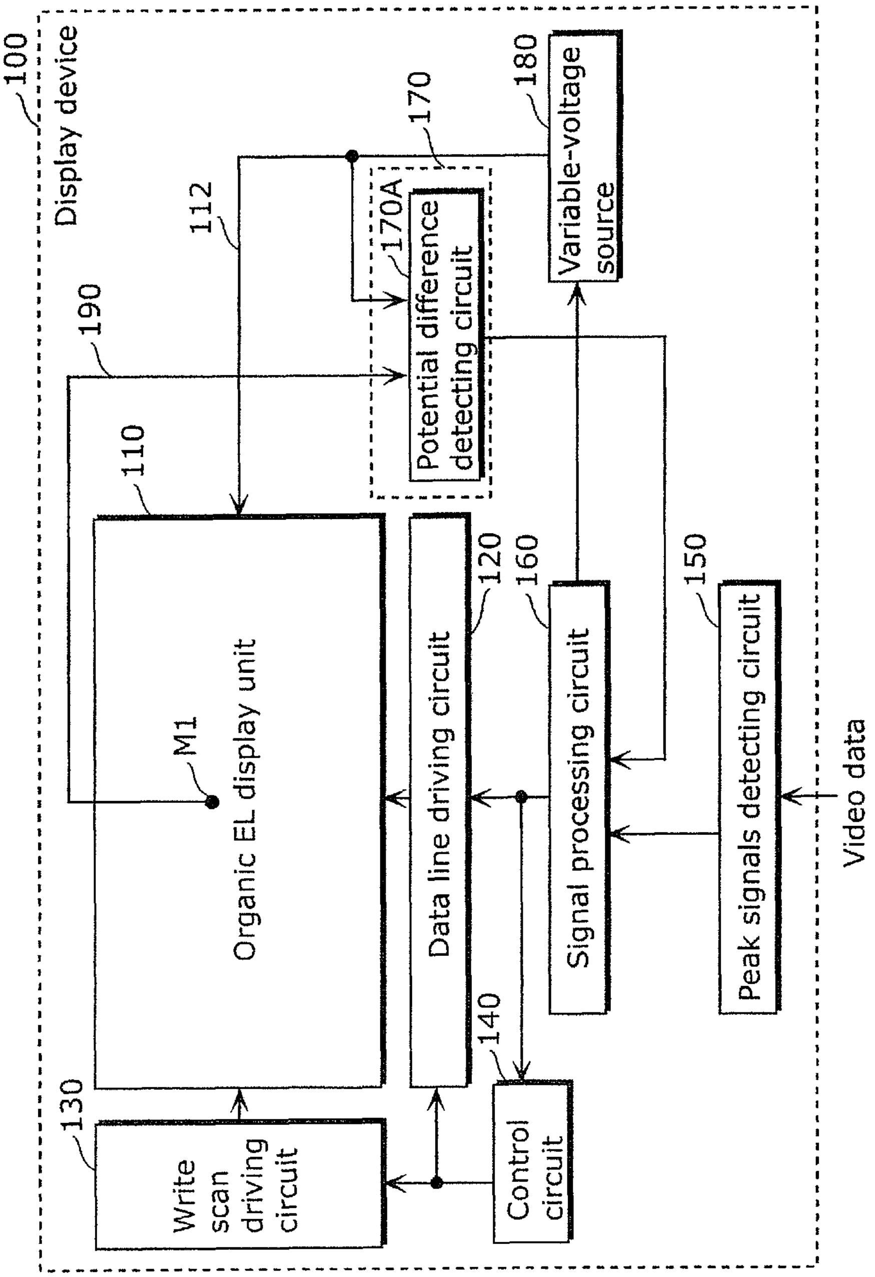
FIG. 10 is a block diagram showing an outline configuration of the display device according to the embodiment 2 of the present disclosure.

FIG. 10 is a block diagram showing an outline configuration of the display device according to the embodiment 2 of the present disclosure.

A display device 100 shown in the figure includes an organic EL display unit 110, a data line driving circuit 120, a write scan driving circuit 130, a control circuit 140, a peak signal detecting circuit 150, a signal processing circuit 160, a largest value detecting circuit 170 configured of a potential difference detecting circuit 170A, a variable-voltage source 180, and a monitor wire 190.

The description for the organic EL display unit 110 shall be omitted, since the configuration of the organic EL display unit 110 is identical to the configuration illustrated in FIGS. 2 and 3 in the embodiment 1.

The peak signal detecting circuit 150 detects the peak value of the video data input to the display device 100, and outputs a peak signal indicating the detected peak signal to the signal processing circuit 160. More specifically, the peak signal detecting circuit 150 detects the data with highest gradation level among the video data as the peak value. High gradation level data corresponds to an image that is to be displayed brightly by the organic EL display unit 110.

The signal processing circuit 160 regulates the variable-voltage source 180 such that the potential at the monitor pixel 111M to the predetermined potential, using the peak signal output from the peak signal detecting circuit 150 and the potential difference ΔV detected by the potential different detecting circuit 170. More specifically, the signal processing circuit 160 determines the voltage required for the organic EL element 121 and the driving transistor 125 when the peak signal output from the peak signal detecting circuit 150 is used to emit light from the pixel 111. The signal processing circuit 160 calculates a voltage margin based on the potential difference detected by the potential difference detecting circuit 170A. Subsequently, a sum of the voltage VEL required for the organic EL element 121 and the voltage VTFT required for the driving transistor 125, and the voltage margin Vdrop that are determined is calculated, and the result, that is, VEL+VTFT+Vdrop is output to the variable-voltage source 180 as the voltage of the first reference voltage Vref1.

The signal processing circuit 160 outputs the signal voltage corresponding to the video data input through the peak signal detecting circuit 150 to the data line driving circuit 120.

The potential difference detecting circuit 170A detects, with regard to the monitor pixel 111M, the potential on the high-potential side applied to the monitor pixel 111M. Specifically, the potential difference detecting circuit 170A measures, via the monitor wire 190, a potential on the high-potential side applied to the monitor pixel 111M. Stated differently, the potential at the detecting point M1 is measured. Subsequently, the potential difference detecting circuit 170A measures the output potential on the high-potential side from the variable-voltage source 180, and calculates the potential difference ΔV between the measured high-potential side potential applied to the monitor pixel 111 and the output potential on the high-potential side from the variable-voltage source 180. Subsequently, the potential difference detecting circuit 170A outputs the measured potential difference ΔV to the signal processing circuit 160.

The variable-voltage source 180 is a power supply unit in the present disclosure, and outputs the potential on the high potential side and the potential on the low potential side to the organic EL display unit 110. The variable-voltage source 180 outputs an output voltage Vout setting the potential on the high-potential side of the monitor pixel 111M to a predetermined potential difference (VEL+VTFT), using the first reference voltage Vref1 output by the signal processing circuit 160.

The monitor wire 190 has one end connected to the monitor pixel 111M and the other end connected to the potential difference detecting circuit 170A, and transmits the high-side potential applied to the monitor pixel 111M.

Next, a detailed configuration of the variable-voltage source 180 shall be briefly described.

FIG. 11 is a block diagram showing an example of a specific configuration of a variable-voltage source according to the embodiment 2. Noted that the organic EL display unit 110 and the signal processing circuit 160 which are connected to the variable-voltage source are also shown in the figure.

The variable-voltage source 180 in FIG. 11 is identical to the variable voltage source 180 described in the embodiment 1.

The error amplifier 186 compares the Vout that has been divided by the output detection unit 185 and the first reference voltage Vref1 outputted by the signal processing circuit 160, and outputs, to the PWM circuit 182, a voltage that is in accordance with the comparison result. Specifically, the error amplifier 186 includes an operational amplifier 187 and resistors R3 and R4. The operational amplifier 187 has an inverting input terminal connected to the output detecting unit 185 via the resistor R3, a non-inverting input terminal connected to the signal processing circuit 160, and an output terminal connected to the PWM circuit 182. Furthermore, the output terminal of the operational amplifier 187 is connected to the inverting input terminal via the resistor R4. With this, the error amplifier 186 outputs, to the PWM circuit 182, a voltage that is in accordance with the potential difference between the voltage inputted from the output detecting unit 185 and the first reference voltage Vref1 inputted from the signal processing circuit 160. Stated differently, the error amplifier 186 outputs, to the PWM circuit 182, a voltage that is in accordance with the potential difference between the output voltage Vout and the first reference voltage Vref1.

The PWM circuit 182 outputs, to the drive circuit 183, pulse waveforms having different duties depending on the voltage outputted by the comparison circuit 181. Specifically, the PWM circuit 182 outputs a pulse waveform having a long ON duty when the voltage outputted by the comparison circuit 181 is large, and outputs a pulse waveform having a short ON duty when the outputted voltage is small. Stated differently, the PWM circuit 182 outputs a pulse waveform having a long ON duty when the potential difference between the output voltage Vout and the first reference voltage Vref1 is big, and outputs a pulse waveform having a short ON duty when the potential difference between the output voltage Vout and the first reference voltage Vref1 is small. It is to be noted that the ON period of a pulse waveform is a period in which the pulse waveform is active.

As the output voltage Vout approaches the first reference voltage Vref1, the voltage inputted to the PWM circuit 182 becomes smaller, and the on-duty of the pulse signal outputted by the PWM circuit 182 becomes shorter.

Then, the time in which the switch SW is turned on also becomes shorter, and the output voltage Vout gradually converges with the first reference voltage Vref1.

The potential of the output voltage Vout, while having slight voltage fluctuations, eventually settles to a potential in the vicinity of Vout=Vref1.

In this manner, the variable-voltage source 180 generates the output voltage Vout which becomes the first reference voltage Vref1 outputted by the signal processing circuit 160, and supplies the output voltage Vout to the organic EL display unit 110.

Next, the operation of the display device 100 shall be described with reference to FIGS. 12, 13, and 7.

Figure 12:
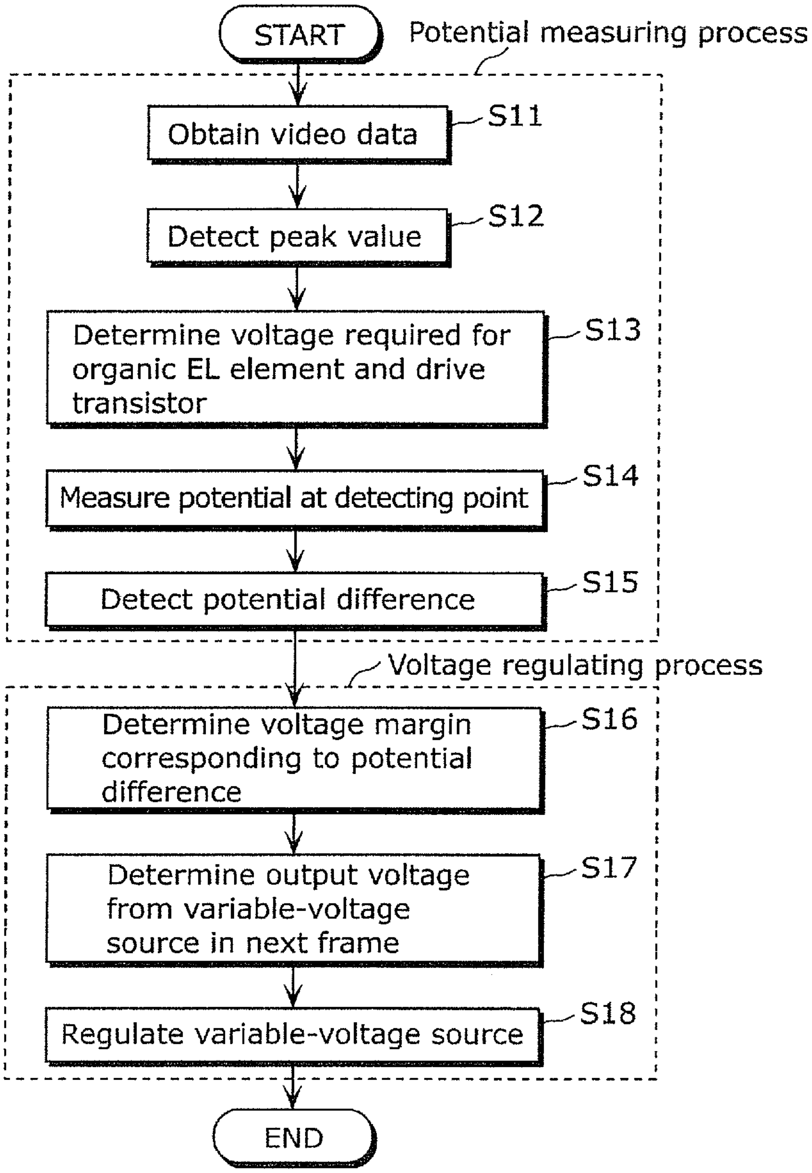
FIG. 12 is a flowchart illustrating an operation of the display device according.

FIG. 12 is a flowchart illustrating an operation of the display device 100.

First, the peak signal detecting circuit 150 obtains video signal data for one frame (step S11). For example, the peak signal calculating circuit 150 has a buffer, and accumulates the video data for one frame period in that buffer.

Next, the peak signal detecting circuit 150 detects the peak value of the obtained video data (step S12), and outputs a peak signal indicating the detected peak signal to the signal processing circuit 160. More specifically, the peak signal detecting circuit 150 detects the peak value of the video data for each color. For example, for each of red (R), green (G), and blue (B), the video data is expressed using the 256 gradation levels from 0 to 255 (luminance being higher with a larger value). Here, when a part of the video data in the organic EL display unit 110 is R:G:B=177:124:135, another part of the video data in the organic EL display unit 110 is R:G:B=24:

177:50, and another part of the video data is R:G:B=10:70:176, the peak signal detecting circuit 150 detects 177 as the peak value of R, 177 as the peak value of G, and 176 as the peak value of B, and outputs the peak signals indicating the pixel values of the colors to the signal processing circuit 160.

Next, the signal processing circuit 160 determines a voltage VTFT required for the drive transistor 125 and a voltage VEL required for the organic EL element 121 for causing the organic EL element 121 to emit light with a peak value output from the peak signal detecting circuit 150 (step S13). Specifically, the signal processing circuit 160 determines the VTFT+VEL corresponding to the gradation levels for each color, using a required voltage conversion table indicating the required voltage VTFT+VEL corresponding to the gradation levels for each color.

FIG. 13 is a chart illustrating an example of the required voltage conversion table referred by the signal processing circuit 160.

As illustrated in FIG. 13, the required voltage VTFT+VEL corresponding to the gradation levels of the colors are stored in the required voltage conversion table. For example, the required voltage corresponding to the peak value 177 of R is 8.5 V, the required voltage corresponding to the peak value 177 of G is 9.9 V, and the required voltage corresponding to the peak value 176 of B is 9.9 V. Among the required voltages corresponding to the peak values of the respective colors, the largest voltage is 9.9 V corresponding to the peak value of B. Therefore, the signal processing circuit 160 determines VTFT+VEL to be 9.9 V.

The potential difference detecting circuit 170 detects the potential at the detecting point M1 via the monitor wire 190 (step S14).

Next, the potential difference detecting circuit 170A detects the potential difference ΔV which is the difference between the potential at the output terminal 184 of the variable-voltage source 180 and the potential at the detecting point M1 (step S15). Subsequently, the potential difference detecting circuit 170A outputs the detected potential difference ΔV to the signal processing circuit 160.

Next, the signal processing circuit 160 determines the voltage margin Vdrop corresponding to the potential difference ΔV detected by the potential difference detecting circuit 170A from the potential difference signal output from the potential difference detecting circuit 170A (step S16). More specifically, the signal processing circuit 160 includes a voltage margin conversion table corresponding to the potential difference ΔV.

As illustrated in FIG. 7, in the voltage margin conversion table, the voltage margins Vdrop corresponding to the potential differences ΔV are stored. For example, when the potential difference ΔV is 3.4 V, the voltage margin Vdrop is 3.4 V. Therefore, the signal processing circuit 160 determines the voltage drop margin Vdrop to be 3.4 V.

As shown in the voltage margin conversion table, the relationship between the potential difference ΔV and the voltage margin Vdrop is an increasing function. Furthermore, the output voltage Vout of the variable-voltage source 180 rises with a bigger voltage drop margin Vdrop. In other words, the relationship between the potential difference ΔV and the output voltage Vout is an increasing function.

Next, the voltage margin setting unit 160 determines the output voltage Vout to be output by the variable-voltage source 180 in the next frame period (step S17). More specifically, the output voltage Vout to be output by the variable-voltage source 180 in the next frame period is set to be VTFT+VEL+Vdrop which is a sum of VTFT+VEL which is the voltage required for the organic EL element 121 and the drive transistor 125 determined in step S13 and the voltage margin Vdrop corresponding to VTFT+VEL and the potential difference ΔV determined in step S15.

Finally, the voltage margin setting unit 160 regulates the variable-voltage source 180 by setting the first reference voltage Vref1 as VTFT+TEL+Vdrop at the beginning of the next frame period (step S18). With this, in the next frame period, the variable-voltage source 180 supplies Vout=VTFT+VEL+Vdrop to the organic EL display unit 110.

As described above, the display device 100 according to the embodiment 2 is configured as a minimum configuration for achieving the power consumption reducing effect. More specifically, the display device 100 according to the embodiment 2 includes the variable-voltage source 180, the potential difference detecting circuit 170A, and the signal processing circuit 160. The variable-voltage source 180 outputs the potential on the high-potential side and the potential on the low-potential side. The potential difference detecting circuit 170A measures the potential on the high-potential side applied to the monitor pixel 111M and high-potential side output voltage Vout from the high-potential side of the variable voltage source 180 for the monitor pixel 111M. The signal processing circuit 170A regulates the variable-voltage source 180 such that the high-potential side potential to be applied to the monitor pixel 111M measured by the potential difference detecting circuit 170A to the predetermined potential (VTFT+VEL). Furthermore, the potential difference detecting circuit 170A measures the output voltage Vout on the high-potential side of the variable-voltage source 180, detects the potential difference between the measured output voltage Vout on the high-potential side and the potential on the high-potential side applied to the monitor pixel 111M. The signal processing circuit 160 regulates the variable-voltage source depending on the potential difference detected by the potential difference detecting circuit 170A.

With this, the display device 100 detects the voltage drop by the horizontal power source wire resistance R1*h* and the vertical power source wire resistance R1*v*, and feeds the degree of voltage drop back to the variable-voltage source 180. With this, excess in the supply voltage can be reduced, reducing the power consumption.

In the display device 100, the monitor pixel 111M is provided near the center of the organic EL display unit 110. Accordingly, even if the side of the organic EL display unit 100 is increased, the output voltage Vout from the variable-voltage source 180 can be easily regulated.

Furthermore, by reducing the power consumption, the heat generated by the organic EL device 121 is suppressed, thereby preventing the degradation of the organic EL element 121.

Next, in the display device 100 described above, the transition of the display pattern when the input video data changes at or before the Nth frame and the n+1th frame and onward shall be described with reference to FIGS. 8 and 9.

First, the video data that is assumed to have been inputted in the Nth frame and the N+1th frame shall be described.

First, it is assumed that, up to the Nth frame, the video data corresponding to the central part of the organic EL display unit 110 is a peak gradation level (R:G:B=255:255:255) in which the central part of the organic EL display unit 110 is seen as being white. On the other hand, it is assumed that the video data corresponding to a part of the organic EL display unit 110 other than the central part is a gray gradation level (R:G:B=50:50:50) in which the part of the organic EL display unit 110 other than the central part is seen as being gray.

Furthermore, from the N+1th frame onward, it is assumed that the video data corresponding to the central part of the organic EL display unit 110 is the peak gradation level (R:G:B=255:255:255) as in the Nth frame. On the other hand, it is assumed that the video data corresponding to the part of the organic EL display unit 110 other than the central part is a gray gradation level (R:G:B=150:150:150) that can be seen as a brighter gray than in the Nth frame.

Next, the operation of the display device 100 in the case where video data as described above is inputted in the Nth frame and the N+1th frame shall be described.

The potential difference ΔV detected by the potential difference detecting circuit 170A, the output voltage Vout from the variable-voltage source 180, and the pixel luminance of the monitor pixel 111M are shown in FIG. 8. Furthermore, a blanking period is provided at the end of each frame period.

In a time t=T10, the peak signal detecting circuit 150 detects the peak value of the video data of the Nth frame. The signal processing circuit 160 determines VTFT+VEL from the peak value detected by the peak signal detecting circuit 150. Here, since the peak value of the video data of the Nth frame is R:G:B=255:255:255, the signal processing circuit 160 uses the required voltage conversion table and determines the required voltage VTFT+VEL for the N+1th frame to be, for example, 12.2 V.

Meanwhile, the potential difference detecting circuit 170A detects the potential at the detecting point M1 via the monitor wire 190, and detects the potential difference ΔV which is the difference between the aforementioned potential and the output voltage Vout outputted from the variable-voltage source 180. For example, ΔV=1 V is detected in time t=T10. Subsequently, the voltage margin Vdrop in the N+1th frame is determined as 1 V, using the voltage margin conversion table.

A time t=T10 to T11 is the blanking period of the Nth frame. In this period, an image which is the same as that in the time t=T10 is displayed in the organic EL display unit 110.

(a) in FIG. 9 schematically shows an image displayed on the organic EL display unit 110 in time t=T10 to T11. In this period, the image displayed on the organic EL display unit 110 corresponds to the image data of the Nth frame, and thus the central part is white and the part other than the central part is gray.

For example, in the time t=T11, the signal processing circuit 160 determines the voltage of the first reference voltage Vref1 to be VTFT+VEL+Vdrop which is the sum of the determined required voltage VTFT+VEL and the voltage drop margin Vdrop.

Over a time t=T11 to T16, the image corresponding to the video data of the N+1th frame is sequentially displayed on the organic EL display unit 110 ((b) to (f) in FIG. 9). At this time, the output voltage Vout from the variable-voltage source 180 is, at all times, the VTFT+VEL+Vdrop set to the voltage of the first reference voltage Vref1 in time t=T11. However, the video data corresponding to the part of the organic EL display unit 110 other than the central part is a gray gradation level that can be seen as a gray that is brighter than that in the Nth frame. Therefore, the amount of current supplied by the variable-voltage source 180 to the organic EL display unit 110 gradually increases over a time t=T11 to T16, and the voltage drop in the first power source wire 112 gradually increase following this increase in the amount of current. With this, there is a shortage of power source voltage for the pixels 111 in the central part of the organic EL display unit 110, which are the pixels 111 in a brightly displayed region. Stated differently, luminance drops below the image corresponding to the video data R:G:B=255:255:255 of the N+1th frame. Specifically, over the time t=T11 to T16, the luminance of light emitted from the pixels 111 at the central part of the organic EL display unit 110 gradually drops.

In a time t=T16, the peak signal detecting circuit 150 detects the peak value of the video data of the N+1th frame. Here, since the detected peak value of the video data of the N+1th frame is R:G:B=255:255:255, the signal processing circuit 160 determines the required voltage VTFT+VEL for the N+2th frame to be, for example, 12.2 V.

Meanwhile, the potential difference detecting circuit 170A detects the potential at the detecting point M1 via the monitor wire 190, and detects the potential difference ΔV which is the difference between the aforementioned potential and the output voltage Vout outputted from the variable-voltage source 180. For example, ΔV=1 V is detected in time t=T36. Subsequently, the voltage margin Vdrop in the N+1th frame is determined as 3 V, using the voltage margin conversion table.

For example, in the time t=T17, the signal processing circuit 160 determines the voltage of the first reference voltage Vref1 to be VTFT+VEL+Vdrop which is the sum of the determined required voltage VTFT+VEL and the voltage drop margin Vdrop. Therefore, from the time t=17 onward, the potential difference between the anode side and the cathode side of the monitor pixel 111M is VTFT+VEL which is the predetermined potential.

In this manner, in the display device 100, although luminance temporarily drops in the N+1th frame, this is a very short period and thus has practically no impact on the user.

Embodiment 3

In the embodiment 3, an example different from the embodiment 1, in which the display device includes, as a minimum configuration for achieving the power consumption reduction effect, one detecting point (M1) connected to the monitor wire (detecting wire) shall be described. The display device according to the embodiment 3 is approximately identical to the display device 100 according to embodiment 2, but is different in that the potential difference detecting circuit 170A is not included, and the potential at the detecting point M1 is input to the variable-voltage source. In addition, the operation by the signal processing circuit is different in that the voltage output to the variable voltage source is the required voltage VTFT+VEL. With this, the display device according to the embodiment 2 can regulate the output voltage Vout from the variable-voltage source in real time according to the amount of voltage drop. Thus, compared to the embodiment 2, it is possible to prevent the temporary reduction in the pixel luminance. The following is the specific description with reference to the drawings.

Figure 14:
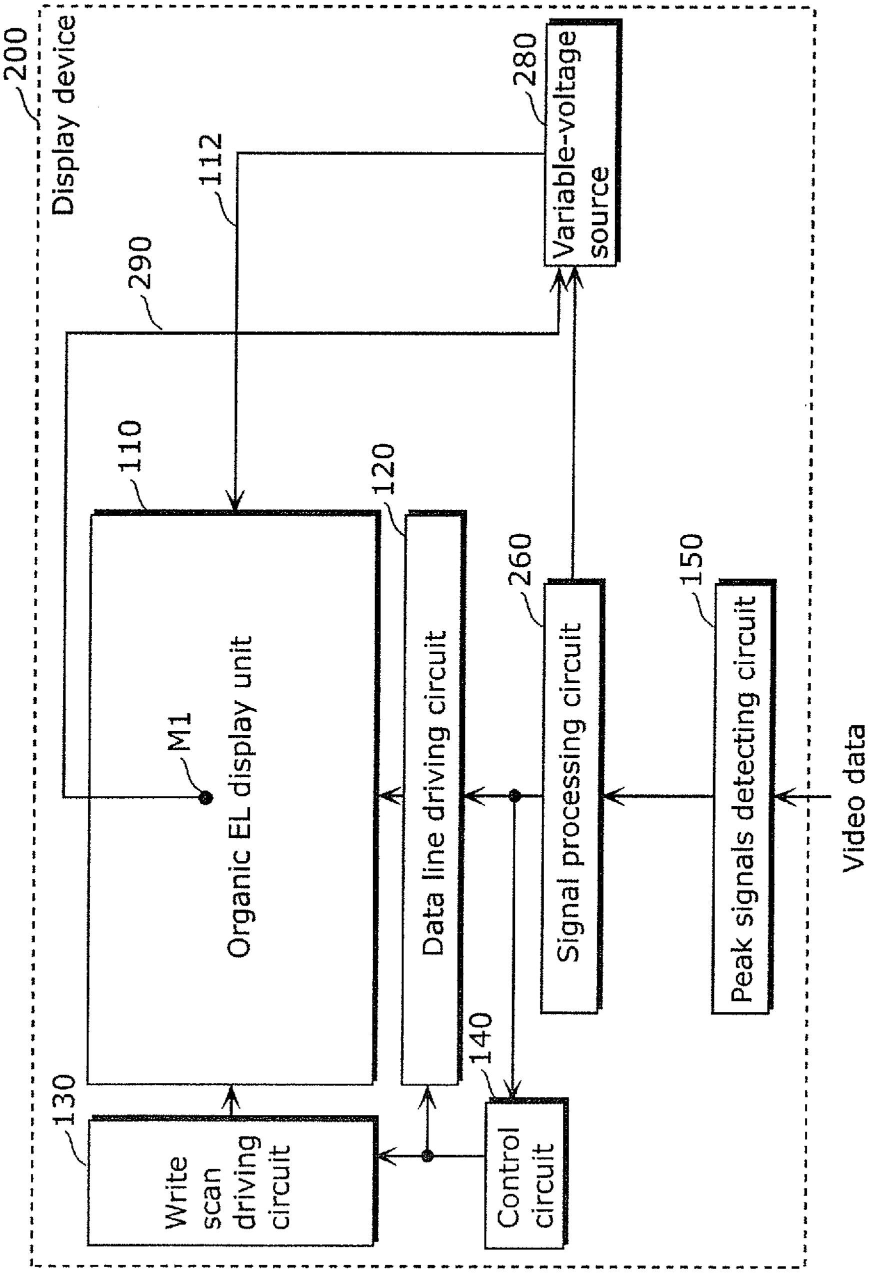
FIG. 14 is a block diagram showing an outline configuration of the display device according to the embodiment 3.

FIG. 14 is a block diagram showing an outline configuration of the display device according to the embodiment 3 of the present disclosure.

The display device 200 according to the embodiment 3 is different from the display device 100 according to the embodiment 2 in FIG. 10 in that the potential difference detecting circuit 170 is not provided, monitor wire 290 is provided instead of the monitor wire 190, a signal processing circuit 260 is provided instead of the signal processing circuit 160, and a variable-voltage source 280 is provided instead of the variable-voltage source 180.

The signal processing circuit 260 determines the voltage of the second reference voltage Vref2 to be output to the variable-voltage source 280 from the peak signal output form the peak signal detecting circuit 150. Specifically, the signal processing circuit 260 determines the VTFT+VEL, using a required voltage conversion table, which is a sum of the voltage VEL necessary for the organic EL element 121 and the voltage VTFT required for the drive transistor 125. Subsequently, the determined VTFT+VEL is determined as the voltage of the second reference voltage Vref2.

As described above, the second reference voltage Vref output to the variable-voltage source 280 by the signal processing circuit 260 in the display device 200 is the voltage determined depending only on the video data, unlike the first reference voltage Vref1 output to the variable-voltage source 180 by the signal processing circuit 160 in the display device 100 according to the embodiment 2. In other words, the second reference voltage Vref2 does not depend on the potential difference ΔV between the output voltage Vout from the variable-voltage source 280 and the potential at the detecting point M1.

The variable-voltage source 280 measures, via the monitor wire 290, the high-potential side potential applied to the monitor pixel 111M. Stated differently, the potential at the detecting point M1 is measured. Subsequently, the output voltage Vout is regulated according to the measured potential at the detecting point M1 and the second reference voltage Vref2 output from the signal processing circuit 260.

The monitor wire 290 has one end connected to the detecting point M1 and the other end connected to the variable-voltage source 280, and transmits the potential at the detecting point M1 to the variable-voltage source 280.

Figure 15:
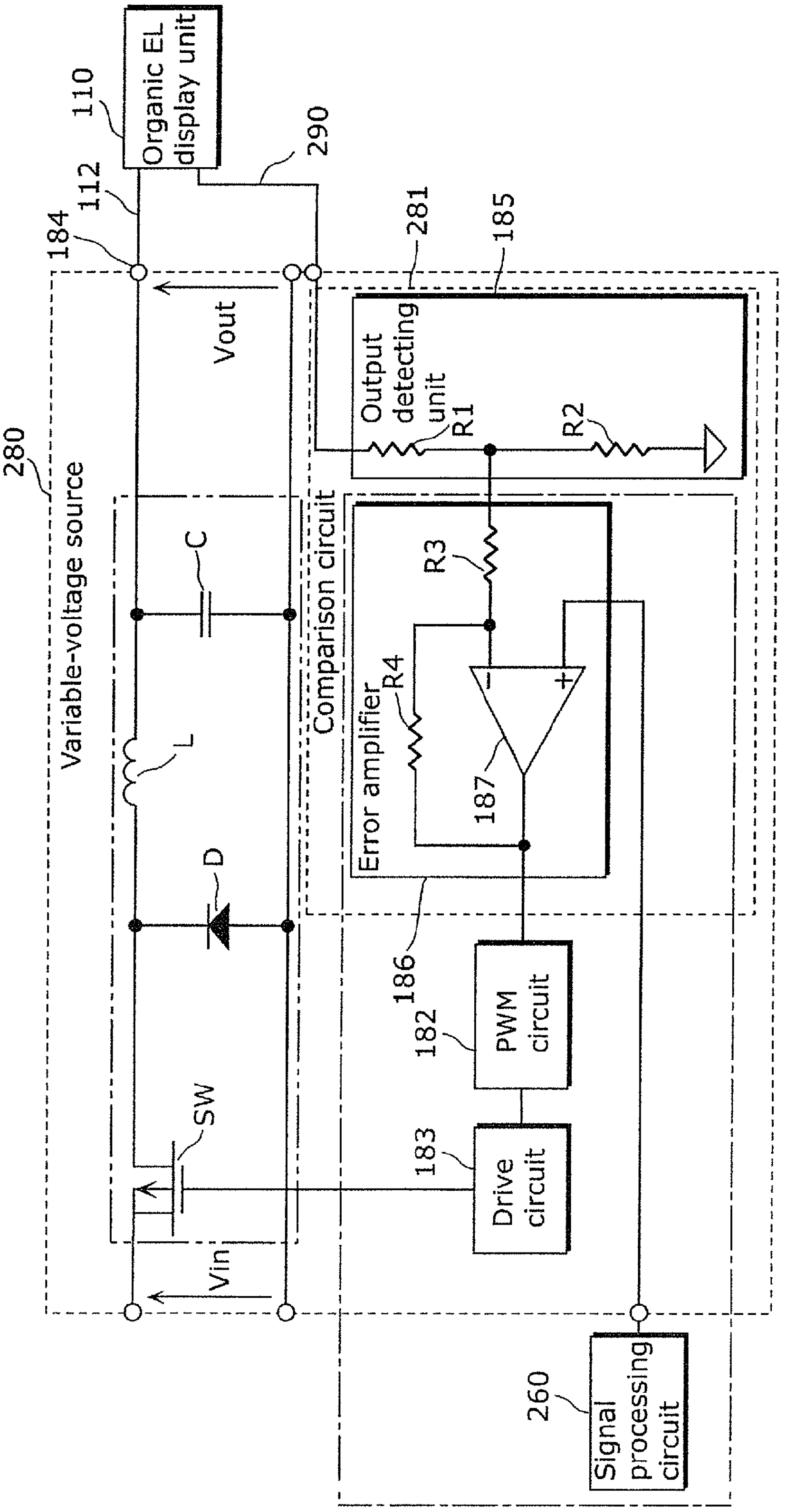
FIG. 15 is a block diagram showing an example of a specific configuration of a variable-voltage source according to the embodiment 3.
Figure 16:
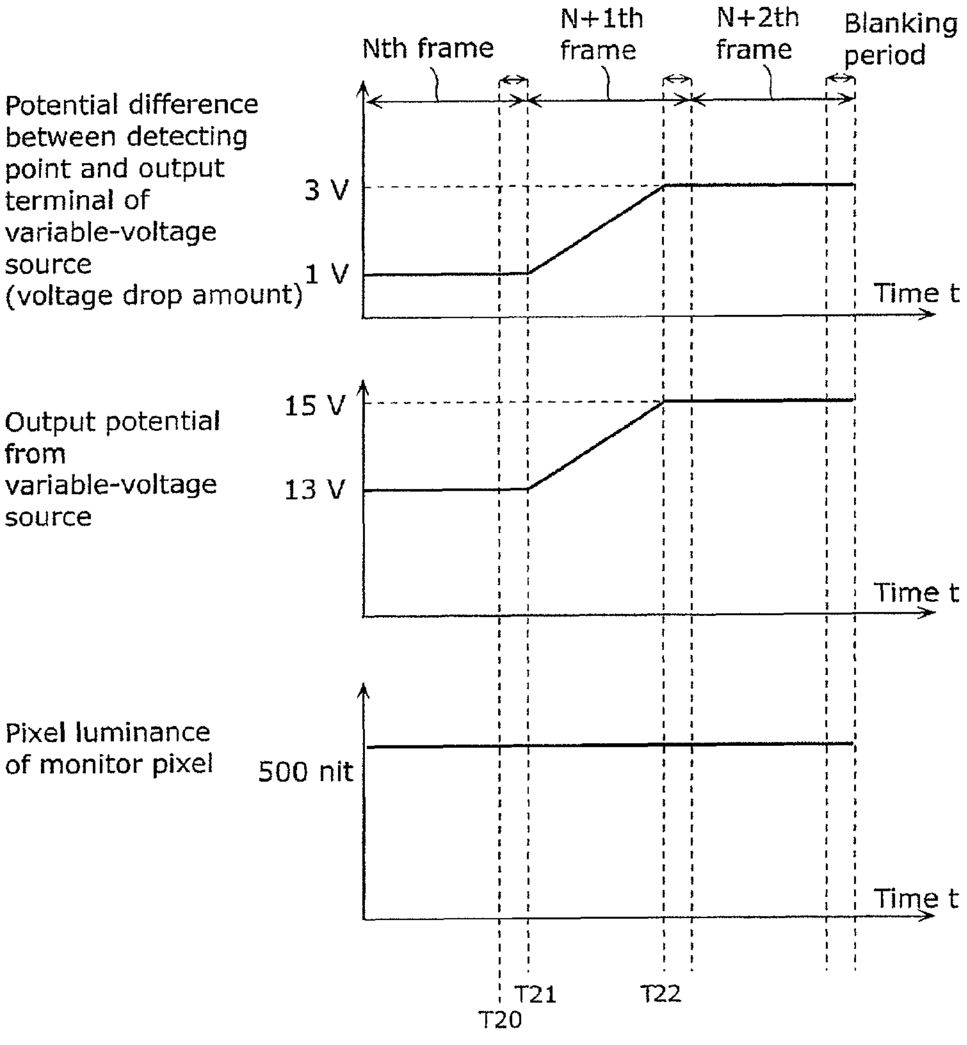
FIG. 16 is a timing chart illustrating the operation of the display device from the Nth frame to N+2th frame.

FIG. 15 is a block diagram showing an example of a specific configuration of a variable-voltage source 280 according to the embodiment 3. Noted that the organic EL display unit 110 and the signal processing circuit 260 which are connected to the variable-voltage source are also shown in the figure.

The configuration of the variable-voltage source 280 is nearly identical to the configuration of the variable voltage source 180 illustrated in FIG. 11, but is different in that a comparison circuit 281 for comparing the potential at the detecting point M1 and the second reference voltage Vref2 are included, instead of the comparison circuit 181.

Here, if the output potential from the variable voltage source 280 is Vout, and the amount of voltage drop from the output terminal 184 of the variable-voltage source 280 to the detecting point M1 is ΔV, the potential at the detecting point M1 is Vout−ΔV. More specifically, in the embodiment 4, the comparison circuit 281 compares Vref2 and Vout−ΔV. As described above, Vref2=VTFT+VEL. Thus, the comparison circuit 281 compares VTFT+VEL and Vout−ΔV.

In the embodiment 2, the comparison circuit 181 compares Vref1 and Vout. As described above, Vref1=VTFT+VEL+ΔV. Accordingly, in the embodiment 2, the comparison circuit 181 compares VTFT+VEL+ΔV and Vout.

Accordingly, although the comparison targets of the comparison circuit 281 are different from the comparison targets of the comparison circuit 181, the comparison results are identical. More specifically, in the embodiments 2 and 3, if the amount of voltage drop from the output terminal 184 in the variable-voltage source 280 to the detecting point M1 is equal, the voltages output by the comparison circuit 181 to the PWM circuit and the voltage output by the comparison circuit 281 to the PWM circuit are equal. Consequently, the output voltage Vout from the variable-voltage source 180 and the output voltage from the variable-voltage source 280 are equal. In other words, the relationship between the potential difference ΔV and the output voltage Vout is an increasing function in the embodiment 2 as well.

The display device 200 with the configuration described above can regulate the output voltage Vout in real time according to the potential difference ΔV between the output terminal 184 and the detecting point M1, compared to the display device 100 according to the embodiment 2. The following describes the reason of this operation. In the display device 100 according to the embodiment 2, the signal processing circuit 160 changes the first reference voltage Vref1 in the frame is changed at the beginning of each frame period. In contrast, in the display device 200 according to the embodiment 3, Vout can be adjusted without passing through the signal processing circuit 260, that is, independent of the control by the signal processing circuit 260, by the input of a voltage dependent on ΔV, more specifically, the Vout−ΔV directly to the comparison circuit 181 in the variable voltage source 280.

Next, in the display device 200 described above, the operation by the display device 200 when the input video data changes at or before the Nth frame and at or after the n+1th frame in the same manner as the embodiment 2 shall be described. Note that, in the same manner as the embodiment 2, the input video data has R:G:B=255:255:255 at the central part of the organic EL display unit 110, and R:G:B=50:50:50 other than the central part at or before the Nth frame, and has R:G:B=255:255:255 at the central part of the organic EL display unit 110, and R:G:B=150:150:150 other than the central part.

FIG. 8 is a timing chart showing the operation of the display device 200 from the Nth frame to the N+2th frame.

In a time t=T20, the peak signal detecting circuit 150 detects the peak value of the video data of the Nth frame. The signal processing circuit 260 determines VTFT+VEL from the peak value detected by the peak signal detecting circuit 150. Here, since the peak value of the video data of the Nth frame is R:G:B=255:255:255, the signal processing circuit 160 uses the required voltage conversion table and determines the required voltage VTFT+VEL for the N+1th frame to be, for example, 12.2 V.

In contrast, the output detecting unit 185 always detects the potential at the detecting point M1 through the monitor wire 290.

For example, in the time t=T21, the signal processing circuit 260 determines the voltage of the second reference voltage Vref2 to be VTFT+VEL (for example, 12.2 V).

Over a time t=T21 to T22, the image corresponding to the video data of the N+1th frame is sequentially displayed on the organic EL display unit 110. Therefore, the amount of current supplied by the variable-voltage source 280 to the organic EL display unit 110 gradually increases, as described in the embodiment 2. Accordingly, as the amount of current increases, the voltage drop in the first power source wire 112 gradually increases. Stated differently, the potential at the detecting point M1 gradually decreases. Stated differently, the potential difference ΔV between the output voltage Vout and the potential at the detecting point M1 gradually increases.

Here, the error amplifier 186 outputs the voltage according to the potential difference between VTFT+VEL and Vout−ΔV in real time, and thus outputs the voltage for increasing Vout according to the increase in the potential difference ΔV.

Accordingly, the variable-voltage source 280 increases Vout in real time according to the increase in the potential difference ΔV.

With this, the shortage of the power source voltage in the pixel 111 at the central part of the organic EL display unit 110, which is the pixel in a region brightly displayed. In other words, the reduction in the pixel luminance is solved.

As described above, the display device 200 according to the embodiment 2 is configured as a minimum configuration for achieving the power consumption reducing effect. More specifically, in the display device 200, the error amplifier 186, the PWM circuit 182 and the drive circuit 183 configuring the variable-voltage source 280 and the signal processing unit 260 detect the potential difference between the potential of the monitor pixel 111M on the high-potential side measured by the output detecting unit 185 and the predetermined potential, and regulates the switch SW according to the detected potential difference. With this, the display device 200 according to the embodiment 4 can adjust the output voltage Vout from the variable-voltage source 280 in real time according to the amount of voltage drop, compared to the display device 100 according to the embodiment 2. Thus, it is possible to prevent the temporary reduction in the pixel luminance, compared to the embodiment 2.

Note that, in the embodiment 3, the organic EL display unit 110 corresponds to the display unit according to the present disclosure, the signal processing circuit 160, the error amplifier 186 in the variable voltage source 280, the PWM circuit 182 and the drive circuit 183 surrounded by the chain line corresponds to the voltage regulating unit according to the present disclosure. The switch SW, the diode D, the inductor L, and the capacitor C surrounded by the chain double-dashed line in FIG. 15 correspond to the power supply unit according to the present disclosure.

Embodiment 4

The following shall describe a configuration of the display device according to the embodiment 4 of the present disclosure for achieving the power consumption reduction effects in which multiple detecting points (M1 to M5) connected to the monitor wire (detecting lines).

Although the display device according to the embodiment 4 is nearly identical to the display device 100 according to the embodiment 2, the display device is different in that potentials on the high-potential side of two or more of the pixels 111 are measured, potential differences between the measured potentials and the output voltage of the output voltage of the variable-voltage source 180 are detected, and the variable-voltage source 180 is regulated according to the largest potential difference among the detection result. With this, it is possible to regulate the output voltage Vout from the variable-voltage source 180 more appropriately. Therefore, power consumption can be effectively reduced even when the size of the organic EL display unit is increased. The following is the specific description with reference to the drawings.

Figure 17:
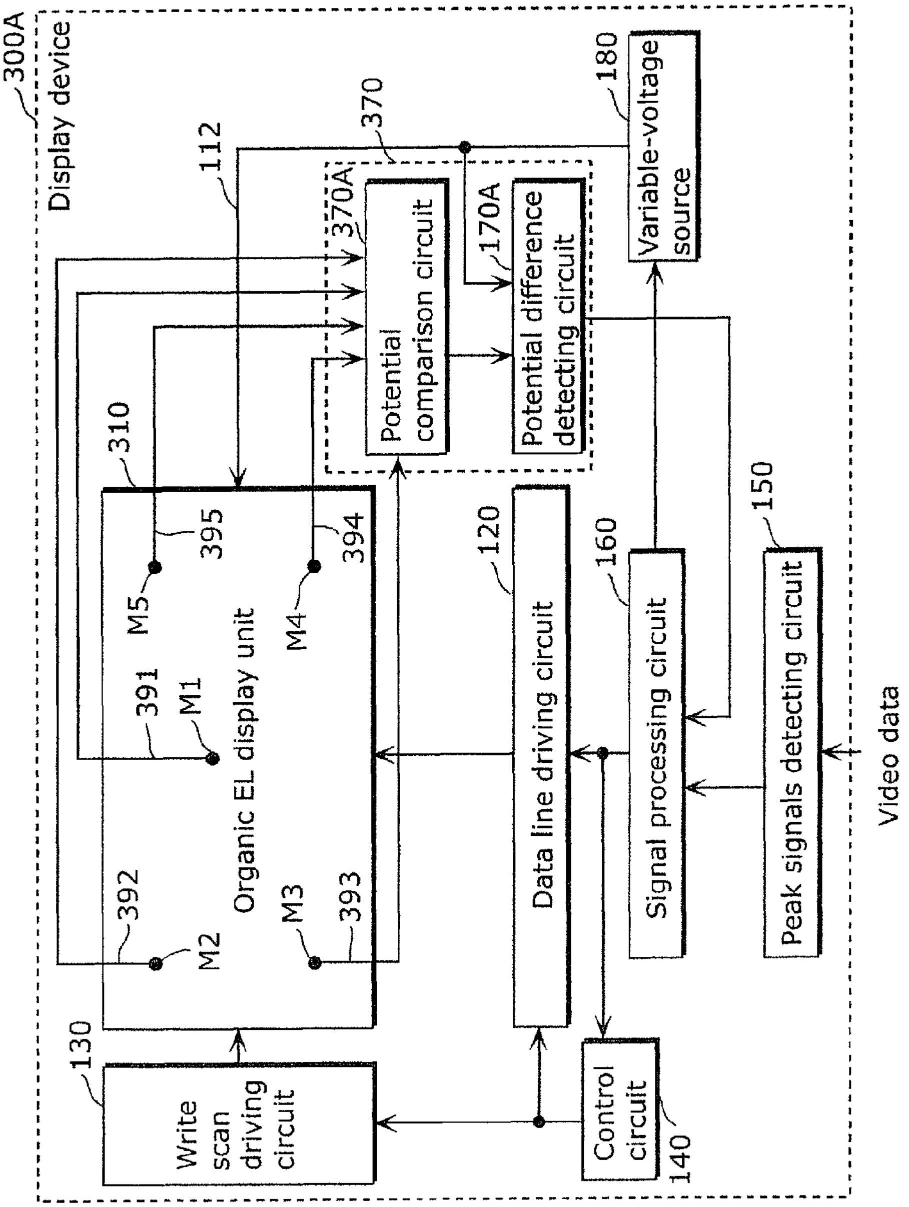
FIG. 17 is a block diagram showing an outline configuration of the display device according to the embodiment 4.

FIG. 17 is a block diagram showing an outline configuration of the display device according to the embodiment 4 of the present disclosure.

The organic EL display unit 300A is approximately the same as the organic EL display unit 100 according to the embodiment 2 illustrated in FIG. 10, but is different from the organic EL display unit 100 in that a potential comparison circuit 370A is provided, and the monitor wires 391 to 395 are provided instead of the monitor wire 190. Here, a largest value circuit 370 is configured with the potential comparison circuit 370A and the potential difference detecting circuit 170A.

The organic EL display unit 310 approximately the same as the organic EL display unit 110, but is different in that monitor wires 391 to 395 provided corresponding to the detecting points M1 to M5 one by one, and for measuring the potential at the corresponding detecting points.

Note that, five detecting points are illustrated as the anode-side potential measuring points in FIG. 17. However, the detecting points may have to be more than one, and may be two or three.

Each of the monitor wires 391 to 395 is connected to the corresponding one of the detecting points M1 to M5, and to the potential comparison circuit 370A, and transmits the potential of the corresponding detecting point to the potential comparison circuit 370A. With this, the potential comparison circuit 370A measures, via each of the monitor wires 391 to 395, the potential of the corresponding detecting points M1 to M5.

The potential comparison circuit 370A measures, via each of the monitor wires 391 to 395, the potential of the corresponding detecting points M1 to M5. Stated differently, the potential comparison circuit 370 measures the high-potential side potential applied to the monitor pixels 111M. In addition, the potential comparison circuit 370A selects the lowest potential among the measured high-potential side potential at the detecting points M1 to M5, and outputs the selected potential to the potential difference detecting circuit 170A.

The potential difference detecting circuit 170A detects the potential difference ΔV between the input potential and the output voltage Vout to the variable-voltage source 180, and outputs the detected potential ΔV to the signal processing circuit 160.

Accordingly, the signal processing circuit 160 regulates the variable-voltage source 180 based on the potential selected by the potential comparison circuit 370A. As a result, the variable-voltage source 180 supplies the output voltage Vout which does not cause reduction in luminance of any of the monitor pixels 111M to the organic EL display unit 310.

As described above, in the display unit 300A according to the embodiment 4, the potential comparison circuit 370A measured the applied potential on the high-potential side for each of the pixels 111 in the organic EL display unit 310, and selects the smallest potential among the measured potentials of the pixels 111. Subsequently, the potential difference detecting circuit 170A detects the potential difference ΔV between the smallest potential selected by the potential comparison circuit 370A and the output voltage Vout from the variable-voltage source 180. The variable-voltage source 180 is regulated according to the potential difference detected by the signal processing circuit 160.

Note that, in the display device 300A according to the embodiment 4, the variable-voltage source 180 corresponds to the power supply unit according to the present disclosure, the organic EL display unit 310 corresponds to the display unit according to the present disclosure, the other part of potential comparison circuit 370A, the potential difference detecting circuit 170A, and the signal processing circuit 160 correspond to the voltage regulating unit according to the present disclosure.

In the display device 300A, the potential comparison circuit 370A and the potential difference detecting circuit 170A are separately provided. However, instead of the potential comparison circuit 370A and the potential difference detecting circuit 170A, a potential comparison circuit for comparing the output voltage Vout from the variable-voltage source 180 and the potentials at the detecting points M1 to M5.

Figure 18:
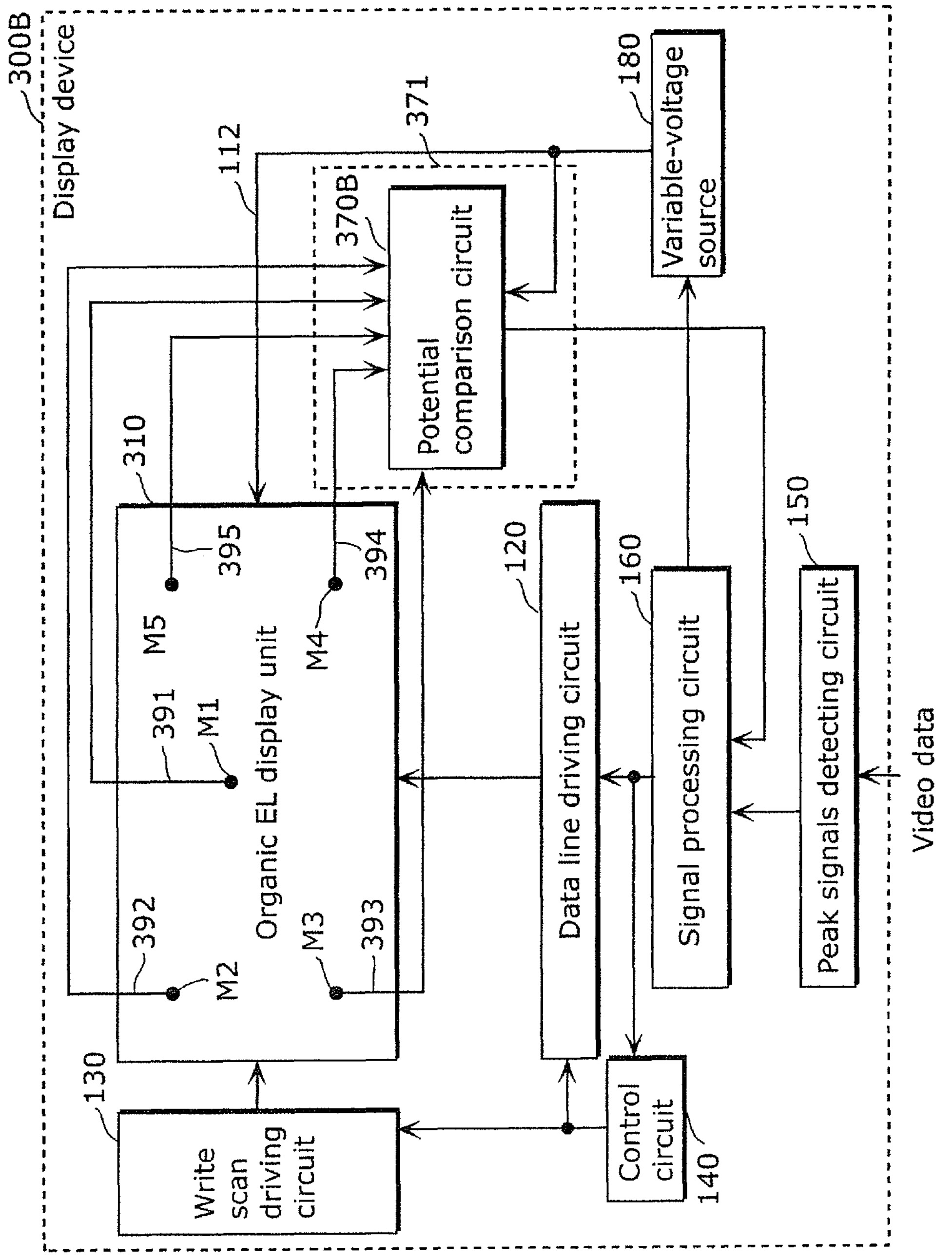
FIG. 18 is a block diagram showing another example of an outline configuration of the display device according to the embodiment 4.

FIG. 18 is a block diagram showing another example of an outline configuration of the display device according to the embodiment 4.

The configuration of the display device 300B in FIG. 18 is nearly identical to the configuration of the display device 300A in FIG. 17. However, the configuration of the largest value circuit 371 is different. More specifically, the display device 300B includes the potential comparison circuit 370B, instead of the potential comparison circuit 370A and the potential difference detecting circuit 170A.

The potential comparison circuit 370B detects the potential differences corresponding to the detecting points M1 to M5 by comparing the output voltage Vout from the variable-voltage source 180 and the detecting points M1 to M5. Subsequently, the potential difference comparison circuit 370B selects the largest potential difference of the detected potential differences, and outputs the largest potential difference ΔV to the signal processing circuit 160.

In the same manner as the signal processing circuit 160 in the display device 300A, the signal processing circuit 160 regulates the variable-voltage source 180.

Note that, with regard to the display device 300B, the variable voltage source 180 corresponds to the power supply unit according to the present disclosure, and the organic EL display unit 310 corresponds to the display unit according to the present disclosure.

As described above, the display devices 300A and 300B according to the embodiment 4 supplies the output voltage Vout which does not cause reduction in luminance of any of the monitor pixels 111M to the organic EL display unit 310. In other words, by setting the output voltage Vout to a more appropriate value, power consumption is further reduced and the decrease in luminance of the pixel 111 is suppressed. The following shall describe this effect with reference to FIGS. 19A to 20B.

Figure 19A:
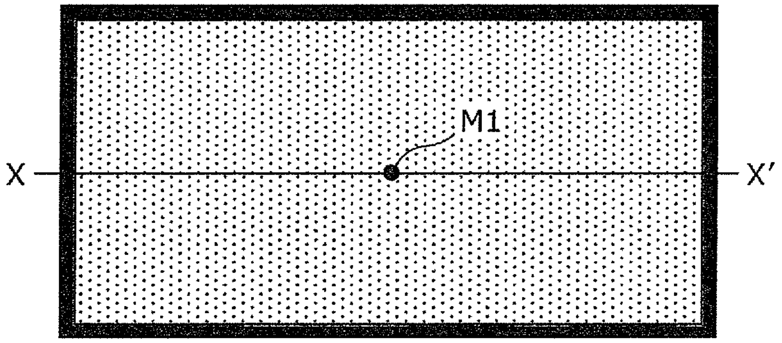
FIG. 19A is a diagram schematically illustrating an example of the image displayed on the organic EL display unit.
Figure 19B:
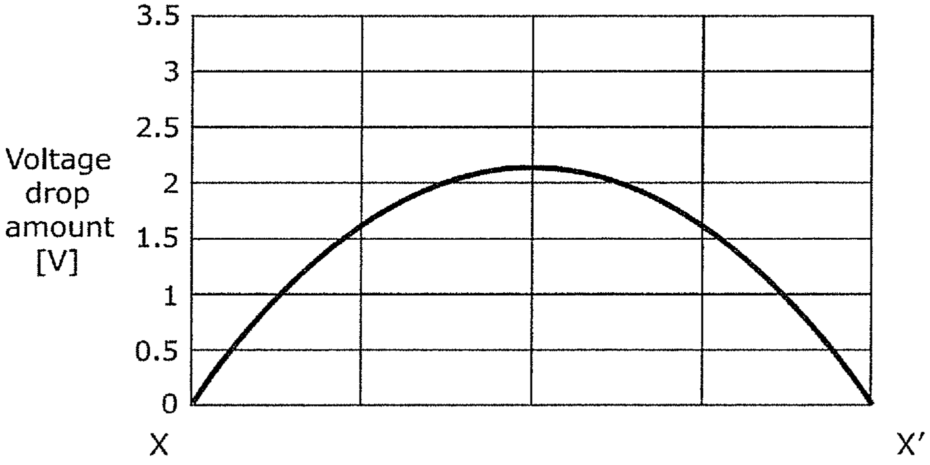
FIG. 19B is a graph illustrating the amount of voltage drop in the first power source wire along the line x-x'.
Figure 20A:
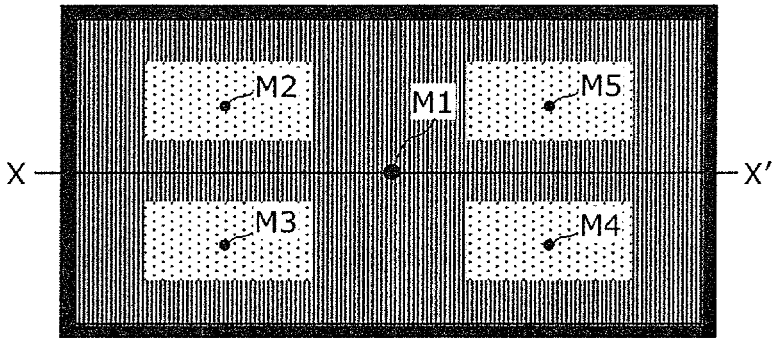
FIG. 20A is a diagram schematically illustrating another example of the image displayed on the organic EL display unit.
Figure 20B:
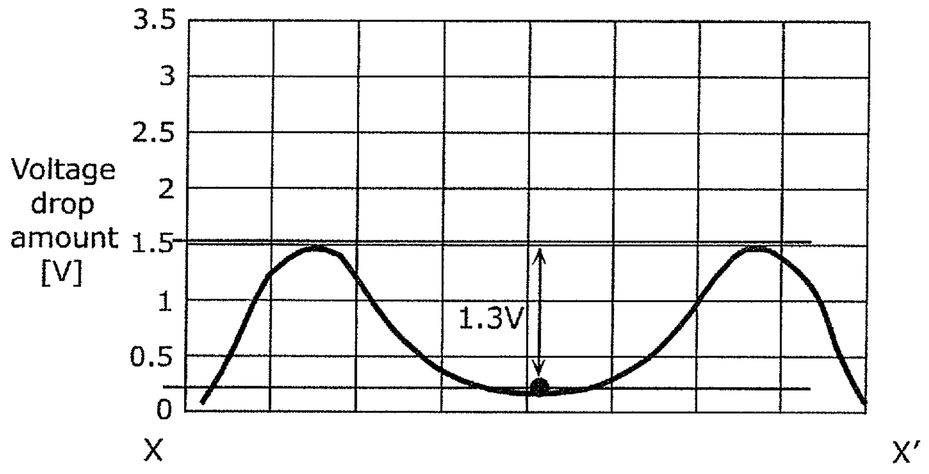
FIG. 20B is a graph illustrating the amount of voltage drop in the first power source wire along the line x-x'.

FIG. 19A is a diagram schematically illustrating an example of the image displayed on the organic EL display unit 310. FIG. 19B is a graph illustrating the amount of voltage drop in the first power source wire 112 along the line x-x' when the image illustrated in FIG. 19A is displayed. FIG. 20A is a diagram schematically illustrating an example of the image displayed on the organic EL display unit 310. FIG. 20B is a graph illustrating the amount of voltage drop in the first power source wire 112 along the line x-x' when the image illustrated in FIG. 20A is displayed.

As illustrated in FIG. 19A, when all of the pixels 111 in the organic EL display unit 310 emit light in the same luminance, the amount of voltage drop in the first power source wire 112 is as illustrated in FIG. 19B.

Accordingly, checking the potential at the detecting point M1 at the center of the screen indicates the worst case of the voltage drop. Accordingly, adding the voltage margin Vdrop corresponding to the amount of voltage drop at the detecting point to VTFT+VEL allows all of the pixels 111 in the organic EL display unit 310 to emit light at a precise luminance.

In contrast, as illustrated in FIG. 20A, a pixel 111 at the center of a region obtained by vertically and horizontally bisecting the screen, that is, a region obtained by dividing the screen into four regions emits light with the same luminance and other pixels 111 does not emit light, the amount of voltage drop in the first power source wire 112 is as illustrated in FIG. 20B.

Accordingly, when measuring the potential only at the detecting point M1 at the center of the screen, it is necessary to set the voltage calculated by adding an offset potential to the detected potential as the voltage drop margin. For example, setting the voltage margin conversion table such that the voltage corresponding to the voltage to which an offset of 1.3 V is always added to the voltage drop amount at the center of the screen (0.2 V) causes all of the pixels 111 in the organic EL display unit 310 to emit light with a precise luminance. Here, emitting light at a precise luminance means that the driving transistor 125 of the pixel 111 is operating in the saturation region.

However, in this case, 1.3 V is always necessary as the voltage margin, decreasing the effects on reducing the power consumption. For example, in the case of an image with the voltage drop amount on the anode side is 0.1 V, 0.1+1.3=1.4 V is held as the voltage margin on the anode side. Thus, the output voltage Vout is increased as much as the voltage margin, decreasing the effects on reducing the power consumption.

Accordingly, dividing the screen into four regions and measuring the potentials at the center of the regions, and the center of the entire screen, that is, the detecting points M1 to M5 as illustrated in FIG. 20A, not just the detecting point M1 at the center of the screen increases the accuracy of detecting the voltage drop amount. Therefore, it is possible to reduce the additional offset amount and increase the power consumption reducing effect.

For example, in FIGS. 20A and 20B, when the potential at the detecting points M2 to M5 is 1.3 V, setting the voltage with an offset of 0.2 V added as the voltage margin on the anode side causes all of the pixels 111 to emit light with a precise luminance.

In this case, even if the image causes the actual amount of voltage drop on the anode side is 0.1 V, the value set as the voltage margin on the anode side is 0.1+0.2=0.3 V. Thus, compared to a case in which only the potential at the detecting point M1 at the center of the screen is measured, it is possible to reduce the power source voltage of 1.1 V.

As described above, compared to the display devices 100 and 200, the display devices 300A and 300B have more detecting points, allowing regulating the output voltage Vout according to the largest value of the measured amounts of voltage drop. Therefore, power consumption can be effectively reduced even when the size of the organic EL display unit 310 is increased.

Embodiment 5

In the embodiment 5, an example different from the embodiment 4, in which the display device includes, as a minimum configuration for achieving the power consumption reduction effect, multiple detecting points (M1 to M5) connected to the monitor wire (detecting wire) shall be described. The display device according to the embodiment 5, measures the potentials on the high-potential side for each of the two or more pixels 111, and detects the potential difference between the potentials and the output voltage from the variable-voltage source, in the same manner as the display devices 300A and 300B according to the embodiment 4. The variable voltage source is regulated to change the output voltage from the variable voltage source according to the largest potential difference among the detection result. However, in the display device according to the embodiment 5 in that the potential selected by the potential comparison circuit is input to the variable-voltage source, instead of the signal processing circuit, compared to the display devices 300A and 300B.

With this, the display device according to the embodiment 5 can regulate the output voltage Vout from the variable-voltage source in real time according to the amount of voltage drop. Thus, compared to the display devices 300A and 300B according to the embodiment 4, it is possible to prevent the temporary reduction in the pixel luminance. The following is the specific description with reference to the drawings.

Figure 21:
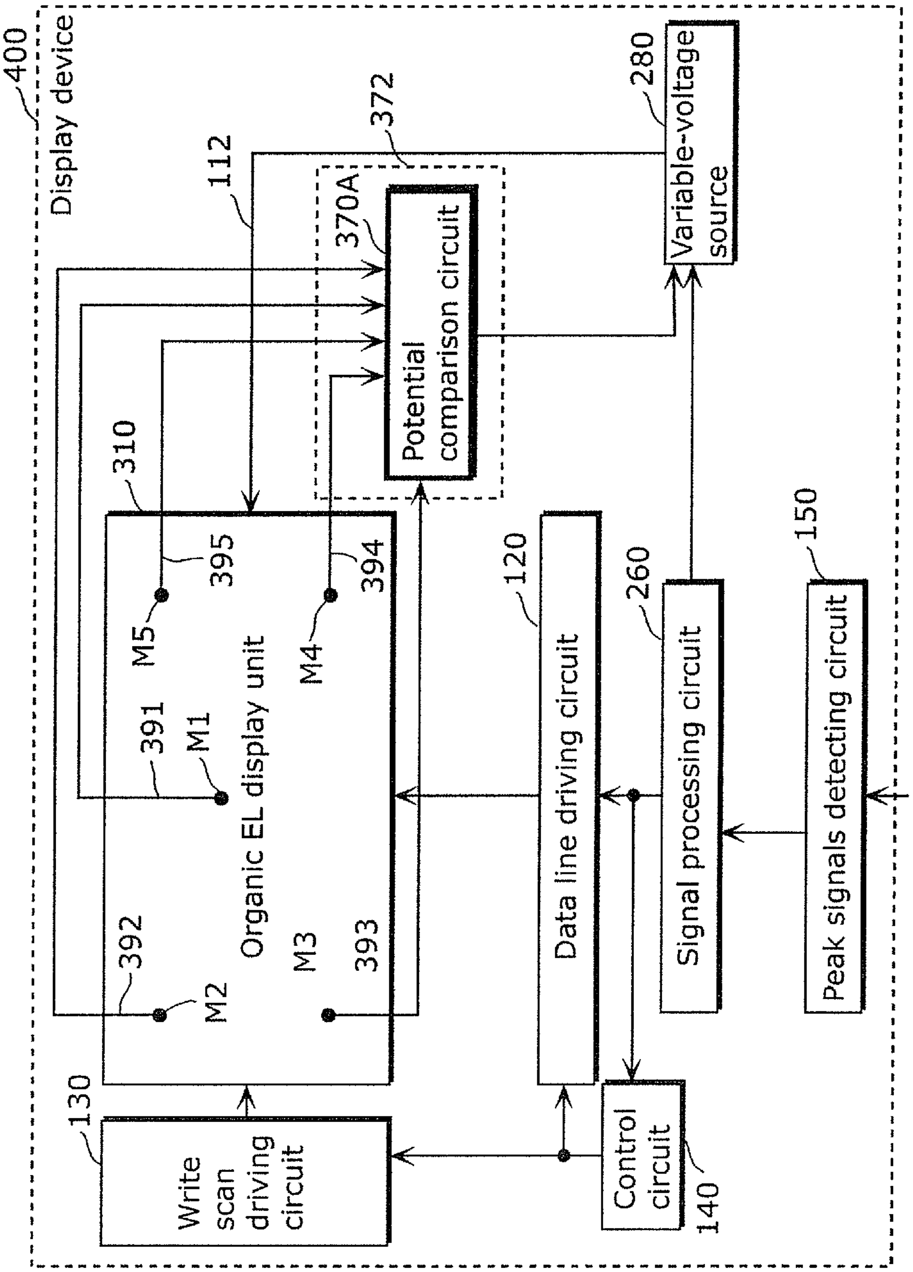
FIG. 21 is a block diagram showing an outline configuration of the display device according to the embodiment 5.

FIG. 21 is a block diagram showing an outline configuration of the display device according to the embodiment 2 of the present disclosure.

The display device 400 in FIG. 21 has the configuration approximately identical to the display device 300A according to the embodiment 4, but is different in that a variable-voltage source 280 is provided instead of the variable voltage source 180, a signal processing circuit 260 is provided instead of the signal processing circuit 160, the potential difference detecting circuit 170A is not provided, a largest value detecting circuit 372 configured of the potential comparison circuit 370A, and a potential selected by the potential comparison circuit 370A is input to the variable voltage source 280.

With this configuration, the variable-voltage source 280 increases the output voltage Vout in real time according to the lowest voltage selected by the potential comparison circuit 370A.

Thus, the display device 400 according to the embodiment 5 can solve the temporary reduction in the pixel luminance, compared to the display devices 300A and 300B.

As described above, according to the display devices of the embodiments 1 to 5, the power consumption can be reduced by regulating at least one of the output potential on the high potential side from the power supply unit and the output potential on the low potential side from the power supply unit according to the amount of voltage drop generated from the power supply unit to at least one of the pixels. Therefore, according to the embodiments 1 to 5, it is possible to implement a display device with high power consumption reducing effect.

The display device highly effective for reducing power consumption is not limited to the embodiments described above. Those skilled in the art will readily appreciate that many modifications are possible in the embodiments 1 to 3 without materially departing from the novel teachings and advantages of the present disclosure. Accordingly, all such modifications and devices incorporating the display device according to the present disclosure are intended to be included within the scope of the present disclosure.

For example, the reduction in the luminance of the pixels on which monitor wire is provided in the organic EL display unit may be compensated.

Figure 22:
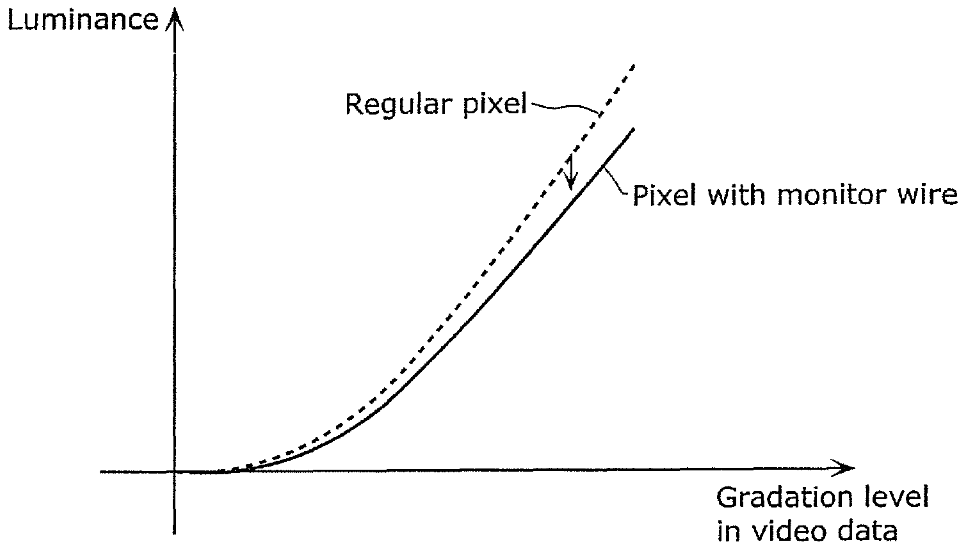
FIG. 22 is a graph illustrating luminance of the light emitted from a regular pixel and luminance of the light emitted from a pixel having a monitor wire, corresponding to gradation levels of the video data.

FIG. 22 is a graph illustrating luminance of the light emitted from a regular pixel and luminance of the light emitted from a pixel having a monitor wire, corresponding to gradation levels of the video data. Noted that a normal pixel refers to a pixel among the pixels of the organic EL display unit, other than the pixel provided with a monitor wire.

Figure 23:
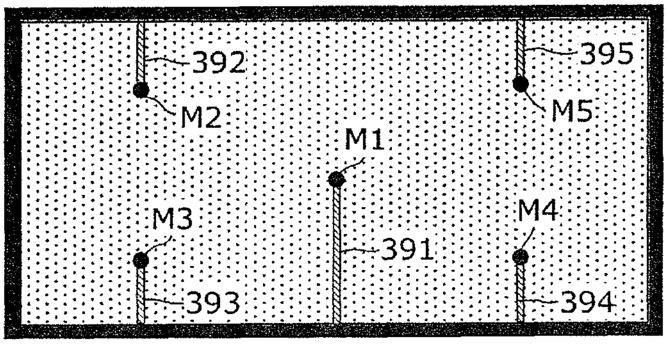
FIG. 23 is a diagram schematically illustrates an image with line defects.
Figure 26:
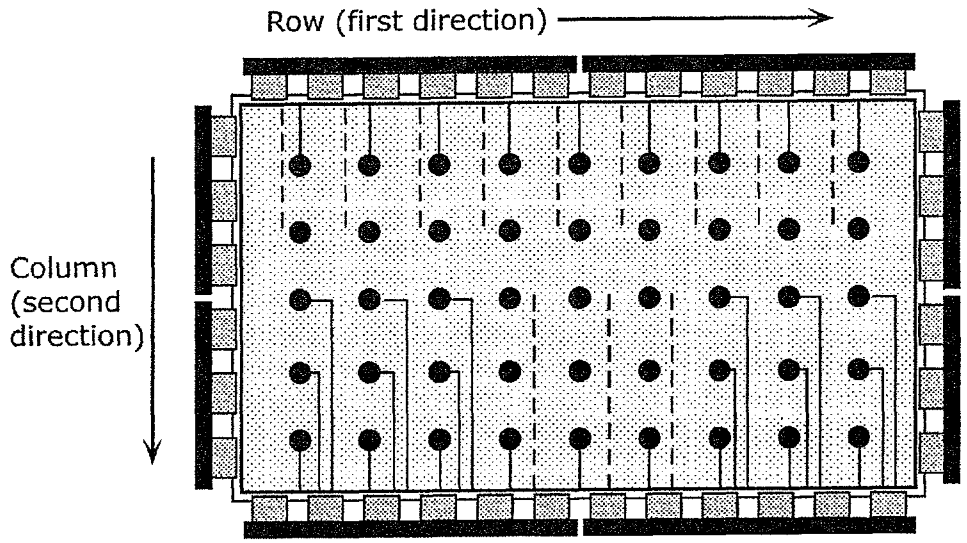
FIG. 26 illustrates the layout of the detecting points in the display unit in an embodiment for comparison.

As clearly shown in FIG. 26, when the gradation level of the video data is the same, the luminance of the pixel including the monitor wire is lower than the luminance of the regular pixel. This is because, with the provision of a monitor wire, the capacitance value of the capacitor 126 of the pixel decreases. Therefore, even when video data which causes luminance of the light emitted to be with the same luminance evenly throughout the entirety of the organic EL display unit is inputted, the image to be displayed on the organic EL display unit is an image in which the luminance of the pixels having a monitor wire is lower than the luminance of the other pixels. In other words, line defects occur. FIG. 23 is a diagram schematically illustrating an image with line defects. FIG. 23 schematically illustrates the image displayed on the organic EL display unit 310 when there are line defects in the display device 300A, for example.

In order to prevent the line defect, the display device may correct the signal voltage supplied to the organic EL display unit from the data line drive circuit 120. Specifically, since the positions of the pixels having a monitor wire are known at the time of designing, it is sufficient to pre-set the signal voltage to be provided to the pixels in such locations higher by the amount of drop in luminance. With this, it is possible to prevent line defects caused by the provision of monitor wires.

Although the description has been made that the signal processing circuits 160 and 260 include a required voltage conversion table indicating required voltage of VTFT+VEL corresponding to the gradation level of each color, a current-voltage characteristic of the drive transistor 125 and current-voltage characteristic of the organic EL element 121 are included, and VTFT+VEL may be determined using two current-voltage characteristics.

Figure 24:
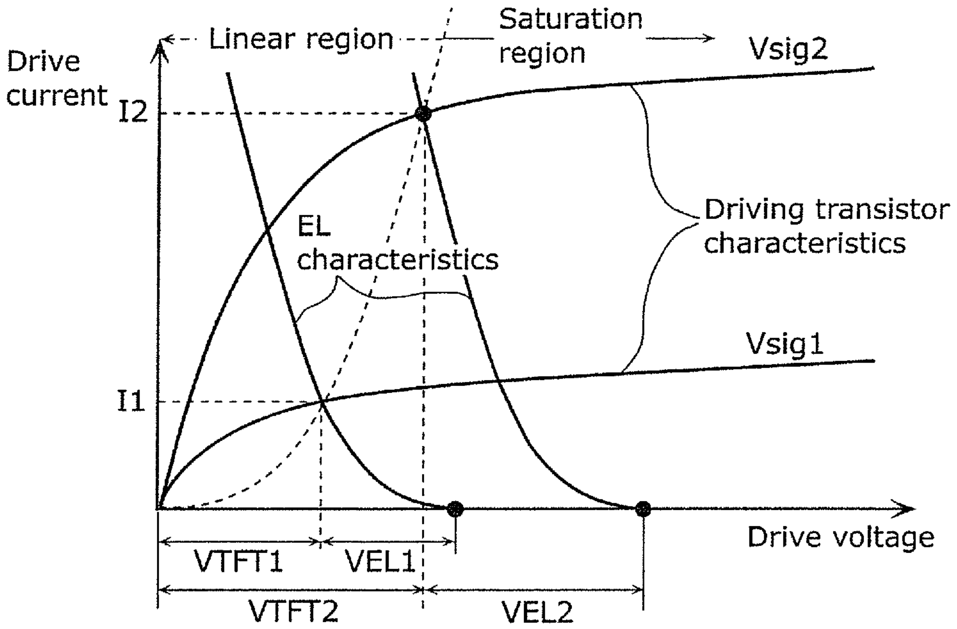
FIG. 24 is a graph illustrating current-voltage characteristics of the drive transistor and current-voltage characteristics of the organic EL element.

FIG. 24 is a graph illustrating current-voltage characteristics of the drive transistor and current-voltage characteristics of the organic EL element. In the horizontal axis, the direction of dropping with respect to the source potential of the driving transistor is the positive direction.

Figure 28:
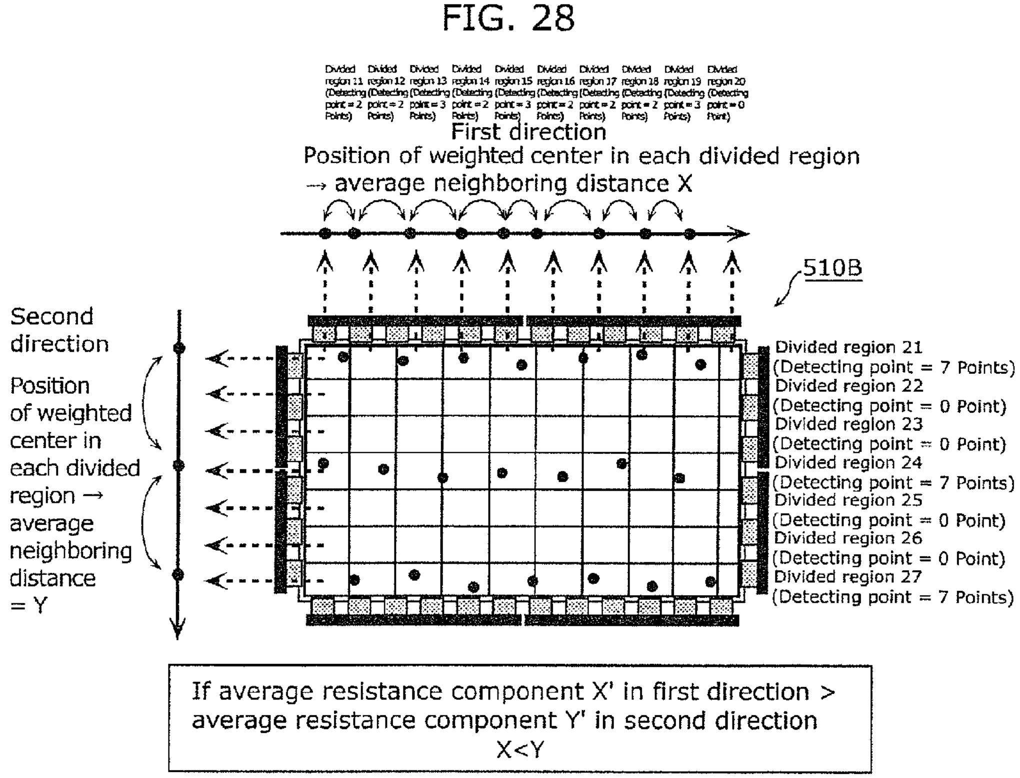
FIG. 28 illustrates the layout of the detecting points in the organic EL display unit according to the variation 2 in the embodiment 6.

FIG. 28 illustrates the current-voltage characteristics of the drive transistor and the current-voltage characteristics of the organic EL element corresponding to the two different gradation levels, and the current-voltage characteristic of the drive transistor corresponding to a low gradation level is represented as Vsig1, and the current-voltage characteristic of the drive transistor corresponding to a high gradation level is represented as Vsig2.

In order to eliminate the effect of the display defect caused by the change in the drain-source voltage in the drive transistor, it is necessary for the drive transistor to operation in the saturation region. On the other hand, the pixel luminescence of the organic EL element is determined according to the drive current. Therefore, in order to cause the organic EL element to emit light precisely in accordance with the gradation level of video data, it is sufficient that the voltage remaining after the drive voltage (VEL) of the organic EL element corresponding to the drive current of the organic EL element is subtracted from the voltage between the source electrode of the driving transistor and the cathode electrode of the organic EL element is a voltage that can cause the driving transistor to operate in the saturation region. Furthermore, in order to reduce power consumption, it is preferable that the drive voltage (VTFT) of the driving transistor be low.

Therefore, in FIG. 24, the organic EL element emits light precisely in accordance with the gradation of the video data and power consumption is lowest with the VTFT+VEL that is obtained through the characteristics passing the point of intersection of the current-voltage characteristics of the driving transistor and the current-voltage characteristics of the organic EL element on the line indicating the boundary between the linear region and the saturation region of the driving transistor, and the power consumption can be reduced at most.

As described above, the required voltage VTFT+VEL corresponding to the gradations for each color may be calculated using the graph shown in FIG. 24.

In the embodiments, the variable-voltage source supplies the output voltage Vout on the high-potential side to the first power source wire 112, and the second power source wire 113 is grounded at the periphery of the organic EL display unit. However, the variable-voltage source may supply the output voltage on the low-potential side to the second power source wire 113.

The display device may include a low-potential monitor line having one end connected to the monitor pixel 111M, and the other end connected to the voltage measuring unit according to the other embodiments, and for transmitting the potential on the low-potential side applied to the monitor pixel 111M.

Furthermore, in the embodiments, the voltage measuring unit measures at least one of the high-potential side potential applied to the monitor pixel 111M and the low-potential side potential applied to the monitor pixel 111M, and the voltage regulating unit may regulate the power supply unit according to the measured potential such that the potential difference between the high-potential side potential on the monitor pixel 111M and the low-potential side potential on the monitor pixel 111M to be the predetermined potential difference.

With this, power consumption can be further reduced. This is because, a transparent electrode with high sheet resistance (for example, ITO) is used as the cathode electrode of the organic EL element 121 composing a common electrode included by the second power source wire 113. Thus, the amount of voltage drop in the second power source wire 113 is greater than the amount of voltage drop in the first power source wire 112. Accordingly, the output potential from the power supply unit can be regulated more appropriately according to the low-potential side potential to be applied to the monitor pixel 111M.

The pixel to which the high-potential monitor line for transmitting the potential on the high-potential side is connected and the pixel to which the low-potential monitor line for transmitting the potential on the low-potential side may not be the same pixel.

In the embodiments 3 and 5, the voltage regulating unit may detect the potential difference between the low-potential side potential on the monitor pixel 111M measured by the voltage measuring unit and the predetermined potential, and regulate the power supply unit according to the detected potential difference.

Furthermore, in the embodiments 2 and 4, the signal processing circuit 160 may change the first reference voltage Vref1 for multiple frames (for example, each 3 frames), instead of changing the first reference voltage Vref1 for one frame.

With this, the potential on the first reference voltage Vref1 changes, and thus the power consumption generated at the variable-voltage source 180 can be reduced.

Alternatively, the signal processing circuit may measure the potential differences outputted from the potential difference detecting circuit 170A and the potential comparison circuit 370B over plural frames, average the measured potential differences, and regulate the variable-voltage source in accordance with the average potential difference. More specifically, in the flowchart illustrated in FIG. 12, after detecting the potential at the detecting point (step S14) and detecting the voltage difference for multiple frames, and in determining the voltage margin (step S16), the potential differences for multiple frames detected by the detecting process of the potential differences are averaged (step S15), and the voltage margin may be determined corresponding to the averaged potential difference.

Furthermore, the signal processing circuits 160 and 260 may determine the first reference voltage Vref1 considering an aging deterioration margin for the organic EL element 121. For example, assuming that the aged deterioration margin for the organic EL element 121 is Vad, the signal processing circuit 160 may determine the voltage of the first reference voltage Vref1 to be VTFT+VEL+Vdrop+Vad, and the signal processing circuit 260 may determined the voltage of the second reference voltage Vref2 to be VTFT+VEL+Vad.

Furthermore, although the switch transistor 124 and the driving transistor 125 are described as being p-type transistors in the above-described embodiments, they may be configured of n-type transistors.

Furthermore, although the switch transistor 124 and the driving transistor 125 are TFTs, they may be other field-effect transistors.

The processing units included in the display devices 50, 100, 300A, 300B and 400 according to the embodiments are typically implemented as an LSI which is an integrated circuit. Note that part of the processing units included in the display devices 50, 100, 200, 300A, 300B, and 400 can also be integrated in the same substrate as the organic EL display units 110 and 310. Furthermore, they may be implemented as a dedicated circuit or a general-purpose processor. Furthermore, a Field Programmable Gate Array (FPGA) which allows programming after LSI manufacturing or a reconfigurable processor which allows reconfiguration of the connections and settings of circuit cells inside the LSI may be used.

Furthermore, part of the functions of the data line driving circuit, the write scan driving circuit, the control circuit, the peak signal detecting circuit, the signal processing circuit, and the potential difference detecting circuit included in the display devices 50, 100, 200, 300A, 300B, and 400 according to the embodiments may be implemented by having a processor such as a CPU executing a program. Furthermore, the present disclosure may also be implemented as a display device driving method including the characteristic steps implemented through the respective processing units included in the display devices 50, 100, 200, 300A, 300B, and 400.

Embodiment 6

In the embodiments 1 to 5, a configuration for achieving the power consumption reducing effect in the display device, that is, configurations for monitoring the power source voltage of the pixel using one or more detecting lines (monitor wire) for reducing the power consumption. In the embodiment 6, a layout of the potential detecting points for detecting the potential on the high-potential side or the low-potential side of the pixels for maximizing the power consumption reduction effect while maintaining the image quality of the display device.

In the display device according to the embodiments 1 to 5, in order to maximize the power consumption reducing effect, it is necessary to monitor the distribution of the amount of voltage drop with high accuracy for any image pattern. For this purpose, it is preferable to set as many potential detecting points as possible provided for monitor pixels in the display unit.

However, according to the number of the potential detecting points provided, the number of the monitor wires which are the detecting lines increase. The greater the number of the monitor wires, the more likely the image includes line noise (line defect) in which the image information is not reflected, reducing the image quality of the display. In addition, the increased number of the wire increases the cost.

Accordingly, in terms of the number of the potential detecting points provided, the power consumption reduction effects and the image quality in the display device according to the present disclosure is a trade-off. Accordingly, in order to achieve maximum power consumption reducing effect while maintaining the display quality of the display device, it is necessary to suppress the number of potential detecting points provided by optimizing the layout of the potential detecting points.

Figure 25:
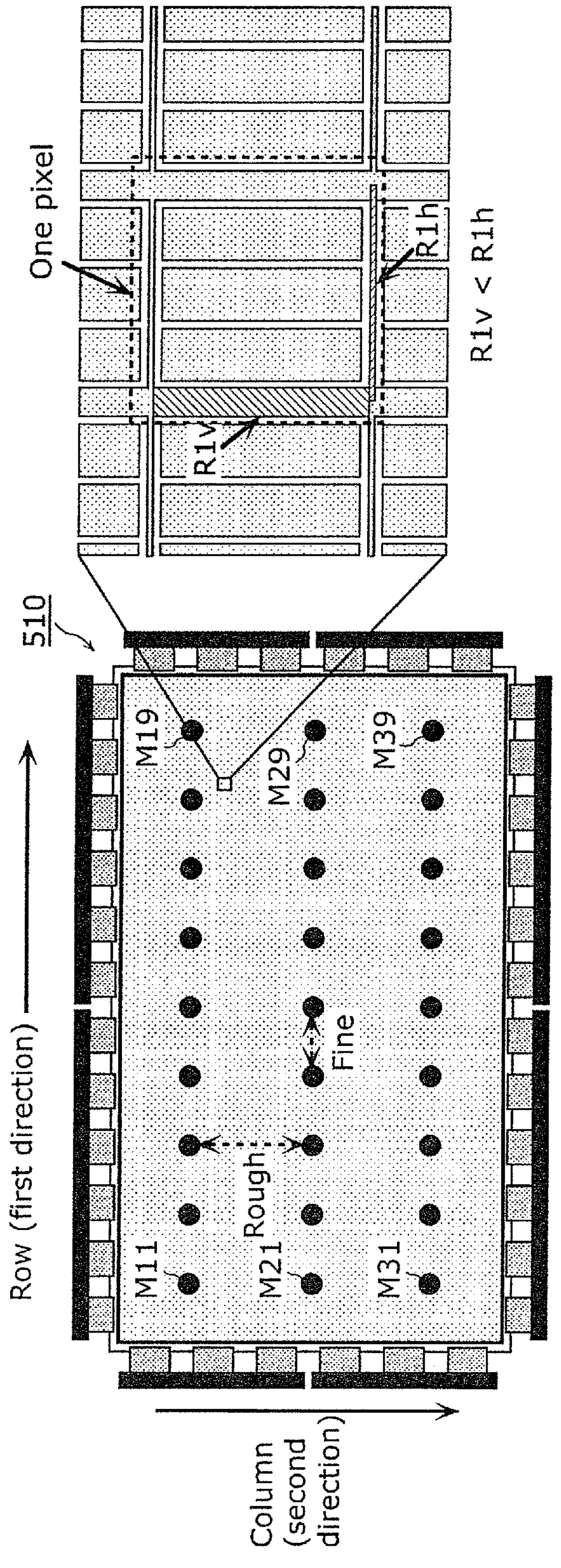
FIG. 25 illustrates the layout of the detecting points in the organic EL display unit according to the embodiment 6.

FIG. 25 illustrates the layout of the detecting points in the organic EL display unit according to the embodiment 6. In the organic EL display unit 510 in FIG. 25, the detecting points M11 to M39 are provided in the row direction which is the first direction and the column direction which is the second direction. The potential detecting points are evenly provided in the row direction, and are evenly provided in the column direction as well. Here, the diagram on the right side of FIG. 25 illustrates the layout of one pixel and the pixels around the pixel. Power source wires on the high-potential side having first power source wire resistance $R1v$ are provided on the left and right of the pixel including three sub pixels as one unit, and power source wires on the high-potential side having first power source wire resistance R1*h* are provided above and below the pixel. Here, due to the relationship of line widths of the power source wires, R1*v*<R1*h*. More specifically, the power source wire resistance R1*h* between adjacent pixels arranged along the first direction is higher than the power source wire resistance R1*v* between adjacent pixels arranged along the second direction.

In the power source wire configuration described above, the change in the voltage drop is sharp in the row direction having high power source wire resistance, and the change in the voltage drop is gradual in the column direction having low power source wire resistance. Accordingly, in order to monitor the distribution of the amount of voltage drop with high accuracy, the potential detecting points shall be finely provided in the row direction, and the potential detecting points shall be roughly provided in the column direction. More specifically, the average distance between adjacent potential detecting points provided along the column direction which is the first direction (for example, an average value of distances between adjacent detecting points from M11 to M19) is shorter than the average distance between adjacent potential detecting points provided along the column direction which is the second direction (for example, an average value of distances between adjacent detecting points M11, M21, and M31).

Appropriately arranging the potential detecting points described above allows high-accuracy monitoring of the voltage drop caused by the power source wire resistance network, and achieving maximum power consumption reducing effect while maintaining the image quality of the display device. Furthermore, it is possible to suppress the increase in cost necessary for providing detecting lines.

FIG. 26 illustrates the layout of the detecting points in the display unit in an embodiment for comparison. In the organic display unit in FIG. 26, compared to the organic EL display unit 510 in FIG. 25, the distance between the detecting points in the column direction is set to be as short as the distance between the detecting points in the row direction, and the distances between the detecting points are equal in the column direction and the row direction in the layout. With the layout, the cycles of the image is likely to be disturbed along the monitor wire for extracting potentials from the detecting points to outside, emphasizing the line noise (line defect). Consequently, the image quality is degraded.

Figure 27A:
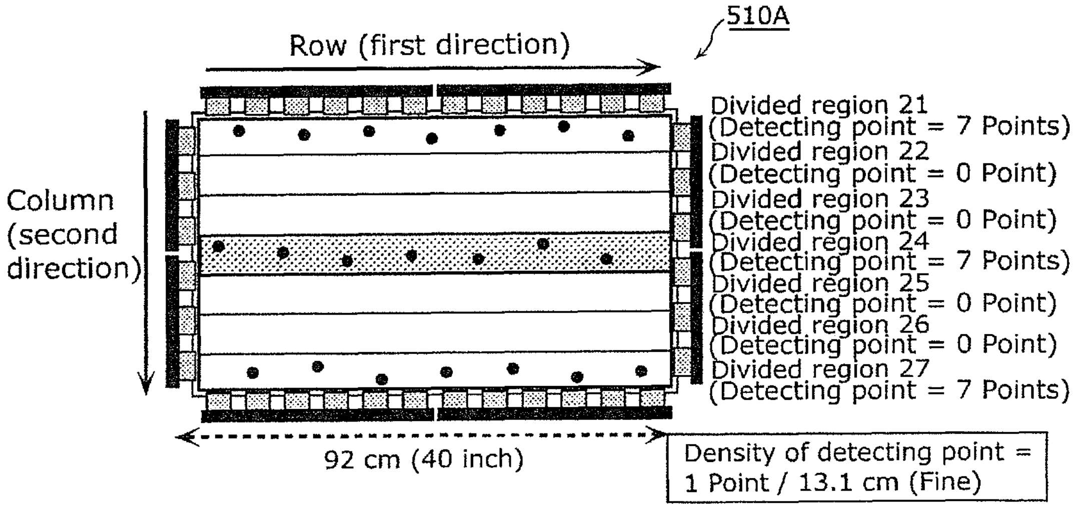
FIG. 27A illustrates the layout of the detecting points in the organic EL display unit according to the variation 1 in the embodiment 6.
Figure 27B:
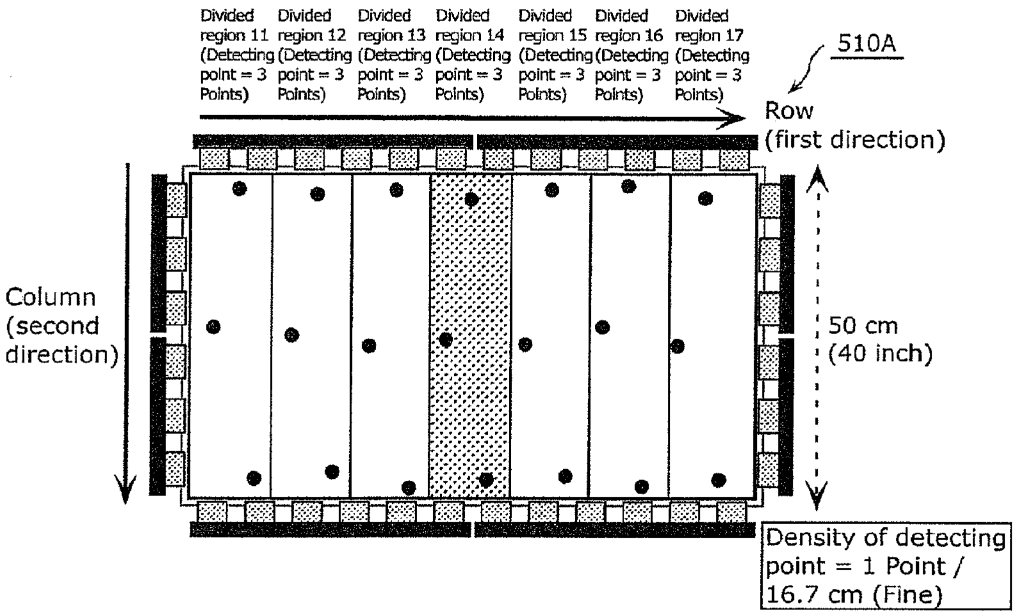
FIG. 27B illustrates the layout of the detecting points in the organic EL display unit according to the variation 1 in the embodiment 6.

FIGS. 27A and 27B are layout diagrams of detecting points in the organic EL display unit according to the variation 1 of the embodiment 6. In the organic EL display unit 510A illustrated in FIG. 27A, regions equally divided in the column direction are displayed at the same time, and the organic EL display unit 510A in FIG. 27B displays the regions equally divided in the row direction at the same time.

The layout of the detecting points in the organic EL display unit 510A illustrated in FIGS. 27A and 27B is different from the layout in the organic EL display unit 510 illustrated in FIG. 25. In the organic EL display unit 510, adjacent detecting points are arranged in the same row of the pixels or in the same column of the pixels. In other words, neighboring detecting points are arranged in a straight line. In the organic EL display unit 510, the neighboring detecting points are not necessarily arranged in the same row of pixels or in the same column of pixels, and the adjacent detecting points are arranged in a zigzag shape in the adjacent detecting points.

In order to achieve highly accurate detection of the amount of voltage drop in any image, it is preferable that the detecting points are arranged with an equal distance in the column direction and the row direction as much as possible. However, if the detecting points are arranged in a straight line in the row direction and column direction, the arrangement of the monitor wires pulled out from the detecting points overlap, making it difficult to disperse the effect of the wire on the image.

In response to the problem, in the organic EL display unit 510A illustrated in FIGS. 27A and 27B, the adjacent detecting points in the predetermined region is shifted to at least in the row direction and the column direction, while maintaining of the equidistant arrangement of the detecting points in the row direction and the column direction. The predetermined region corresponds to the divided regions 21 to 27 in FIG. 27A, and to the divided regions 11 to 17 in FIG. 27B.

The divided regions 11 to 17 are second divided regions set by equally dividing the organic EL display unit 510A in the row direction, which is the first direction. The divided regions 21 to 27 are first divided regions set by equally dividing the organic EL display unit 510A in the column direction, which is the second direction.

Here, in the same manner as the diagram on the right side of FIG. 25, when R1*h*>R1*v*, the average distance between adjacent detecting points in the row direction in the divided regions 21, 24, and 27 which are the first divided regions including the detecting points is set to be shorter than the average distance of the adjacent detecting points in the column direction in the divided regions 11 to 17 which is the second divided regions including the detecting points. For example, if the size of the organic EL display unit is 40 inches, the density of detecting points in the divided regions 21, 24, and 27 is 1 point/13.1 cm, and the density of detecting points in the divided regions 11 to 17 is 1 point/16.7 cm.

According to the condition for arranging the detecting points, even if the detecting points are not provided in straight line in the row direction and the column direction, it is possible to suppress the increase in cost by providing multiple detecting points, and achieve maximum power consumption reducing effect while maintaining the image quality.

FIG. 28 illustrates the layout of the detecting points in the organic EL display unit according to the variation 2 in the embodiment 6. The layout of the detecting points in the organic EL display unit 510B in FIG. 28 is identical to the layout of the detecting points illustrated in FIGS. 27A and 27B, and differs only in the condition for arranging the detecting points to be set. In the layout in FIG. 28, divided regions 11 to 20 and divided regions 21 to 27 corresponding to the divided regions 11 to 17 and the divided regions 21 to 27 in FIG. 27A and FIG. 27B are set.

Among the divided regions 21 to 27 which are the first divided regions, the divided regions 21, 24, and 27 including the detecting points are referred to as first detection divided regions, and an average coordinate (weighted center position) of the detecting points included in the first detection divided region in the column direction is calculated. Furthermore, among the divided regions 11 to 20 which are the second divided regions, the divided regions 11 to 19 which are regions including the detecting points are referred to as the second detection divided regions, and an average coordinate (weighted center position) in the row direction of the detecting points included in the second detection divided region is calculated.

If R1*h*>R1*v*, a first adjacent distance Y calculated by averaging differences in the average coordinates in adjacent first detection divided regions for all of the first detection divided regions is longer than a second adjacent distance X calculated by averaging differences in the average coordinates in adjacent second detection divided regions for all of the second detection divided regions.

The condition for arranging the detecting points also allows suppressing the increase in cost due to providing multiple detecting points, and achieving the maximum power consumption reducing effects while maintaining the image quality even if the detecting points are not arranged in a straight line in the row direction and the column direction.

Figure 29:
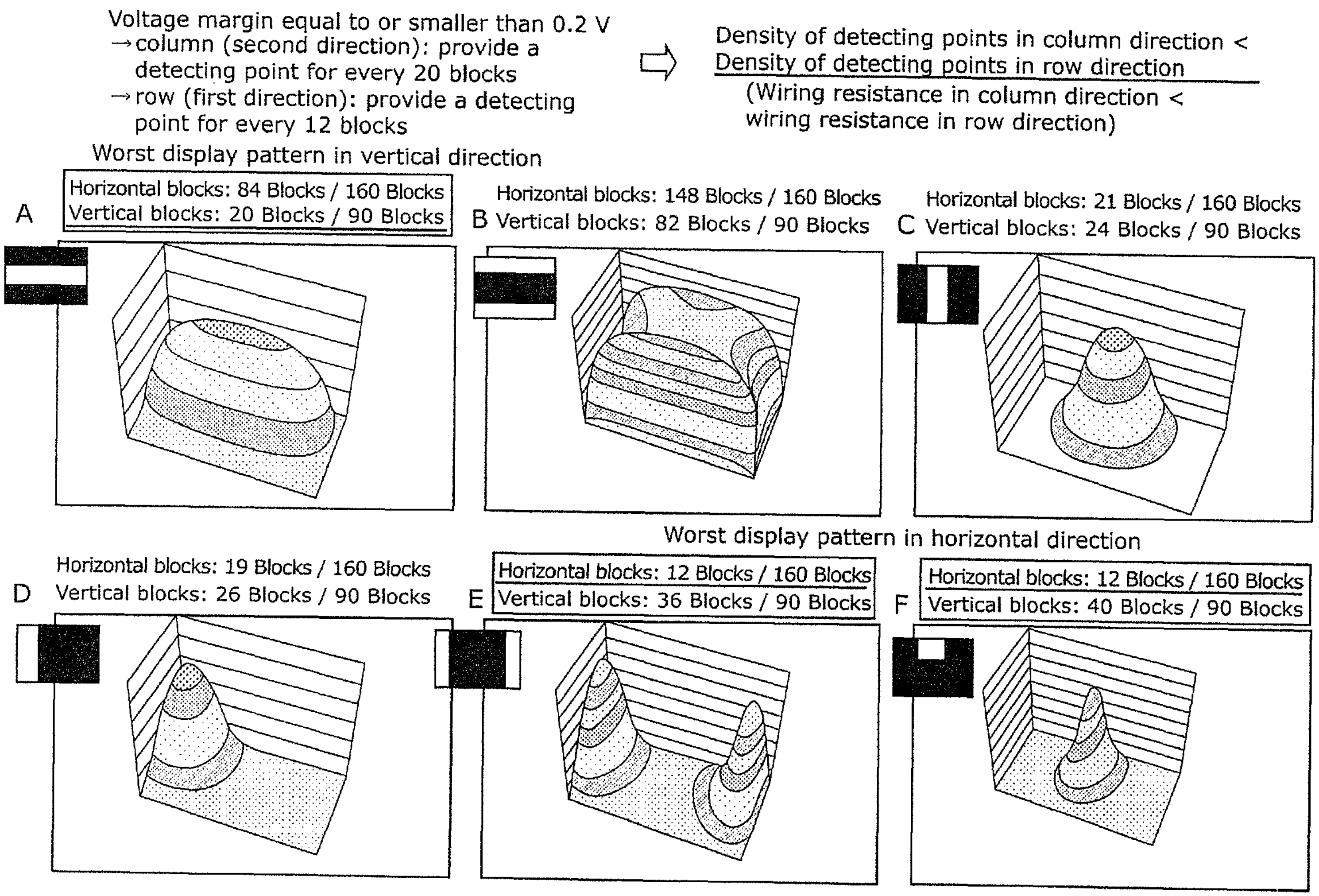
FIG. 29 illustrates the simulation results of the amount of voltage drop in the organic EL display unit according to the embodiment 6.

FIG. 29 illustrates the simulation results of the amount of voltage drop in the organic EL display unit according to the embodiment 6. X-Y plane in each graphs in FIG. 29 represent XY coordinates of the display panel, and the z axis indicates the amount obtained by adding the amount of voltage drop on the high-potential side and the amount of voltage drop on the low potential side. The pattern being displayed is illustrated on the top left side of the graph. When obtaining the simulation result, the following values are set: the power source wire resistance on the high-potential side R1*h*=0.98 (Ω/pix), R1*v*=0.90 (Ω/pix); the power source wire resistance on the low-potential side R2*h*=5.88 (Ω/pix), and R2*v*=1.00 (Ω/pix).

The distribution condition for detecting points necessary for suppressing the voltage margin within 0.2 V is calculated from the simulation result of the amount of voltage drop obtained in the power source wire configuration described above. Here, the organic EL display unit is 40" (4 kpix×2 kpix), and one block includes 160 pixel rows and 90 pixel columns, for example.

In this case, in the pattern A in which the amount of voltage drop in the column direction changes most sharply, it is necessary to provide a detecting point for 20 blocks in the column direction. In the patterns E and F in which the amount of voltage drop changes in the row direction most sharply, it is necessary to provide a detecting point for 12 blocks in the row direction.

The simulation result also indicates that it is necessary to provide the detecting points such that the number of detecting points in the row direction greater than the number of detecting points in the column direction when R2*h*>R2*v*.

Note that, in the embodiment 6, only the layout of the detecting points provided in the organic EL display unit is described. However, as the configuration of the display device including the organic EL display unit, a display device including multiple detecting points are applied, as represented by the configuration of the display devices 300A and 300B in the embodiment 4, and the display device 400 in the embodiment 5. Applying the organic EL display unit according to the embodiment 6 to the display devices 300A, 300B, or 400 allows suppressing the increase in cost by providing multiple detecting points, achieving maximum power consumption reduction effect while maintaining the image quality.

The display device including the organic EL display unit according the embodiment 6, further includes a plurality of detecting lines for transmitting, to the potential difference detecting circuit, potentials on the high-potential side or on the low-potential side, the potentials being detected at a plurality of the potential detecting points, in which the detecting lines include at least one of: three or more high-potential detecting lines for transmitting high-potential side potentials applied to three or more of the pixels, and three or more low-potential detecting lines for transmitting low-potential side potentials applied to three or more of the pixels, and at least one of (i) the high-potential detecting lines and (ii) the low-potential detecting lines are arranged such that an interval between adjacent detecting lines is identical, for example.

With this configuration, it is possible to adjust at least one of the output potential on the high-potential side from the power supply unit and the output potential on the low-potential side from the power supply unit more appropriately, and can effectively reduce the power consumption even when the size of the display unit is increased. Furthermore, since the detecting lines are provided at an equal interval, the layout of the wires in the display unit can be cyclic, which increases the manufacturing efficiency.

Although only some exemplary embodiments of the display device and the driving method for the display device according to the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

Note that, in the description above, the examples in which the display devices 50, 100, 200, 300A, 300B, and 400 are active-matrix organic EL display device are described. However, the present disclosure is not limited to this example. The display device according to the present disclosure may be applied to the organic EL display device other than the active-matrix type, or may be applied to a display device other than the organic EL display device using current-driven light-emitting element, for example, a liquid crystal display.

Figure 30:
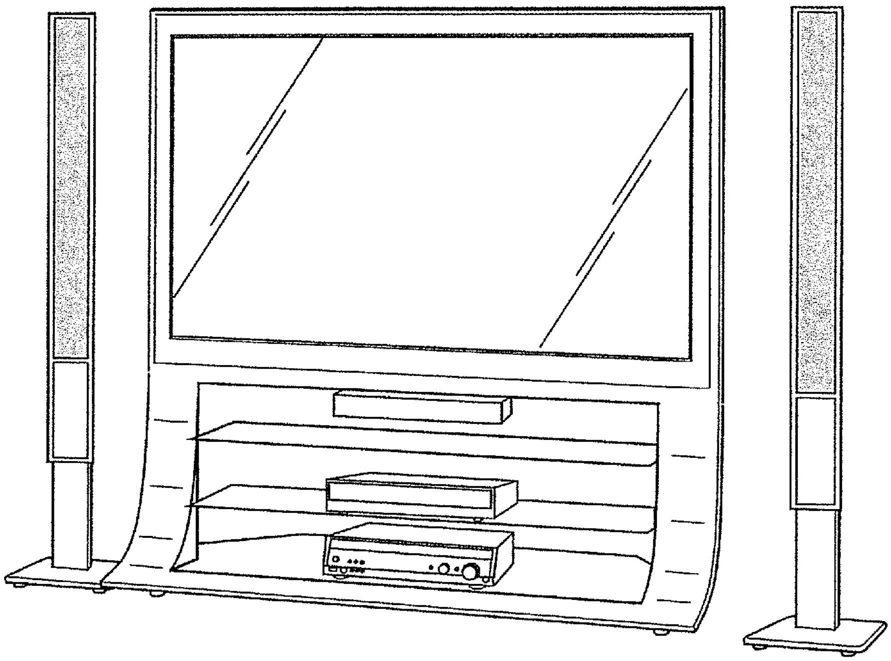
FIG. 30 is an external view of a thin flat TV incorporating the display device according to the present disclosure.

The display device according to the present disclosure is incorporated in a thin flat television as illustrated in FIG. 30, for example. A thin, flat-screen TV capable of high-accuracy image display reflecting a video signal is implemented by incorporating the display device according to the present disclosure into the TV.

INDUSTRIAL APPLICABILITY

The present disclosure is particularly useful for an active-matrix organic EL flat panel display.

The invention claimed is:

1. A display device, comprising:

a power supply unit configured to supply at least a potential on a high-potential side or on a low-potential side;

a display unit including a plurality of pixels arranged in a matrix along a first direction and a second direction that are orthogonal to each other and configured to receive power from the power supply unit;

a potential detecting unit configured to detect at least a potential on one of the high-potential side and the low-potential side at a potential detecting point provided in each of pixels arranged in the display unit; and a voltage regulating unit configured to regulate at least an output potential on the high-potential side or the low-potential side to be supplied from the power supply unit such that a potential difference between (i) at least one of the potentials on the high-potential side and on the low-potential side and (ii) a reference potential reaches a predetermined potential difference, wherein resistance of a power wire at each part between adjacent pixels along the first direction is higher than resistance of a power wire at each part between adjacent pixels along the second direction, an average distance between adjacent potential detecting points along the first direction is shorter than an average distance between adjacent potential detecting points along the second direction, wherein each of the pixels includes a driver and a luminescent element, the predetermined potential difference is a potential difference expressed as VTFT+VEL−ΔV+Vdrop, where VTFT is a voltage required by the driver, VEL is a voltage required by the luminescent element, ΔV is a potential difference between a potential output by the power supply and a potential of a pixel detected by the voltage detecting unit, and Vdrop is a voltage margin corresponding to ΔV.

2. The display device according to claim 1, wherein the driver including a source electrode and a drain electrode; and the luminescent element including a first electrode and a second electrode, the first electrode is connected to one of the source electrode and the drain electrode of the driver, a potential on the high-potential side is applied to one of (i) the other of the source electrode and the drain electrode and (ii) the second electrode, and a potential on the low-potential side is applied to the other of (i) the other of the source electrode and the drain electrode and (ii) the second electrode.

3. The display device according to claim 2, further comprising:

a first power line electrically connecting the other of the source electrodes and the drain electrodes of the drivers included in pixels adjacent in at least one of the first direction and the second direction; and a second power line electrically connecting the second electrodes of the light-emitting elements included in pixels adjacent in the first direction and electrically connecting the second electrodes of the light-emitting elements included in pixels adjacent in the second direction, wherein the pixels receive power from the power supply unit through the first power line and the second power line.

4. The display device according to claim 2, wherein the light-emitting element is an organic EL element.

5. The display device according to claim 1, further comprising a plurality of detecting lines for transmitting, to the potential detecting unit, potentials on the high potential side or on the low potential side, the potentials being detected at a plurality of the potential detecting points, wherein the detecting lines include at least one of:

three or more high-potential detecting lines for transmitting high-potential side potentials applied to three or more of the pixels, and three or more low-potential detecting lines for transmitting low-potential side potentials applied to three or more of the pixels, and at least one of (i) the high-potential detecting lines and (ii) the low-potential detecting lines are arranged such that an interval between adjacent detecting lines is identical.

6. A display device, comprising:

a power supply unit configured to supply at least a potential on a high-potential side or on a low-potential side;

a display unit including a plurality of pixels arranged in a matrix along a first direction and a second direction that are orthogonal to each other and configured to receive power from the power supply unit;

a potential detecting unit configured to detect at least a potential on one of the high-potential side and the low-potential side at a potential detecting point provided in each of pixels arranged in the display unit; and a voltage regulating unit configured to regulate at least an output potential on the high-potential side or the low-potential side to be supplied from the power supply unit such that a potential difference between (i) at least one of the potentials on the high-potential side and on the low-potential side and (ii) a reference potential reaches a predetermined potential difference, wherein resistance of a power wire at each part between adjacent pixels along the first direction is higher than resistance of a power wire at each part between adjacent pixels along the second direction, a plurality of first divided regions are set by equally dividing the display unit in the second direction, a plurality of second divided regions are set by equally dividing the display unit in the first direction, and an average distance between adjacent potential detecting points along the first direction in one of the first divided regions including the potential detecting points is shorter than an average distance between the adjacent potential detecting points along the second direction in one of the second divided regions including the potential detecting points, wherein each of the pixels includes a driver and a luminescent element, the predetermined potential difference is a potential difference expressed as VTFT+VEL−ΔV+Vdrop, where VTFT is a voltage required by the driver, VEL is a voltage required by the luminescent element, ΔV is a potential difference between a potential output by the power supply and a potential of a pixel detected by the voltage detecting unit, and Vdrop is a voltage margin corresponding to ΔV.

7. A display device, comprising:

a power supply unit configured to supply at least a potential on a high-potential side or on a low-potential side;

a display unit including a plurality of pixels arranged in a matrix along a first direction and a second direction that are orthogonal to each other and configured to receive power from the power supply unit;

a potential detecting unit configured to detect at least a potential on one of the high-potential side and the low-potential side at a potential detecting point provided in each of pixels arranged in the display unit; and a voltage regulating unit configured to regulate at least an output potential on the high-potential side or the low-potential side to be supplied from the power supply unit such that a potential difference between (i) at least one of the potentials on the high-potential side and on the low-potential side and (ii) a reference potential reaches a predetermined potential difference, wherein resistance of a power wire at each part between adjacent pixels along the first direction is higher than resistance of a power wire at each part between adjacent pixels along the second direction, a first detection divided region including the potential detecting point is set among a plurality of first divided regions that are set by equally dividing the display unit in the second direction, a second detection divided region including the potential detecting point is set among a plurality of second divided regions that are set by equally dividing the display unit in the first direction, and with respect to an average coordinate in the second direction calculated for one or more of the potential detecting points included in the first detection divided region and an average coordinate in the first direction calculated for one or more of the potential detecting points included in the second detection divided region, a first adjacent distance calculated by averaging differences in the average coordinates in adjacent first detection divided regions for all of the first detection divided regions is longer than a second adjacent distance calculated by averaging differences in the average coordinates between adjacent second detection divided regions for all of the second detection divided regions, wherein each of the pixels includes a driver and a luminescent element, the predetermined potential difference is a potential difference expressed as VTFT+VEL−ΔV+Vdrop, where VTFT is a voltage required by the driver, VEL is a voltage required by the luminescent element, ΔV is a potential difference between a potential output by the power supply and a potential of a pixel detected by the voltage detecting unit, and Vdrop is a voltage margin corresponding to ΔV.

* * * * *